US009964027B2

(12) United States Patent
Hagari et al.

(10) Patent No.: US 9,964,027 B2
(45) Date of Patent: May 8, 2018

(54) CONTROLLER FOR SUPERCHARGER-EQUIPPED INTERNAL COMBUSTION ENGINE AND CONTROL METHOD THEREOF

(71) Applicants: Mitsubishi Electric Corporation, Tokyo (JP); Mazda Motor Corporation, Hiroshima (JP)

(72) Inventors: Hideki Hagari, Tokyo (JP); Takuo Watanuki, Tokyo (JP); Michihisa Yokono, Hyogo (JP); Takafumi Nishio, Hiroshima (JP)

(73) Assignees: Mitsubishi Electric Corporation, Tokyo (JP); Mazda Motor Corporation, Hiroshima (JP)

( * ) Notice: Subject to any disclaimer, the term of this patent is extended or adjusted under 35 U.S.C. 154(b) by 103 days.

(21) Appl. No.: 15/131,526

(22) Filed: Apr. 18, 2016

(65) Prior Publication Data
US 2017/0051662 A1 Feb. 23, 2017

(30) Foreign Application Priority Data
Aug. 21, 2015 (JP) .................. 2015-163411

(51) Int. Cl.
*F02D 23/00* (2006.01)
*F02B 33/44* (2006.01)
(Continued)

(52) U.S. Cl.
CPC .............. *F02B 37/18* (2013.01); *F02D 23/00* (2013.01); *F02D 41/0007* (2013.01);
(Continued)

(58) Field of Classification Search
CPC .......... F02B 37/18; F02B 37/16; F02D 23/00; F02D 41/0007; F02D 41/2432;
(Continued)

(56) References Cited

U.S. PATENT DOCUMENTS 6,279,551 B1 * 8/2001 Iwano ................. F02D 41/0007 60/611
9,062,596 B2 * 6/2015 Maruo ................ F02D 41/0007
(Continued)

FOREIGN PATENT DOCUMENTS

JP 9-228848 A 9/1997
JP 2009-13922 A 1/2009
(Continued)

*Primary Examiner* — Thai Ba Trieu
(74) *Attorney, Agent, or Firm* — Sughrue Mion, PLLC; Richard C. Turner

(57) ABSTRACT

The objective of the present invention is to provide a controller for a supercharger-equipped internal combustion engine and a control method that can reduce man-hours for data measurement and matching, which are required to perform while the internal combustion engine and the supercharger are combined. In a controller, a target turbine flow rate for realizing a target compressor driving force is calculated; a target wastegate flow rate is calculated based on an exhaust gas flow rate and the target turbine flow rate; a target turbine-upstream pressure is calculated based on a target before/after-turbine pressure ratio for realizing the target compressor driving force and a turbine-downstream pressure; a target gate effective opening area is calculated based on the target wastegate flow rate, the target before/after-turbine pressure ratio, and the target turbine-upstream pressure; then, a gate valve control value is calculated.

6 Claims, 6 Drawing Sheets

(51) Int. Cl.
*F02B 37/18* (2006.01)
*F02D 41/00* (2006.01)
*F02D 41/24* (2006.01)
*F02D 41/18* (2006.01)

(52) U.S. Cl.
CPC .......... *F02D 41/2432* (2013.01); *F02D 41/18* (2013.01); *F02D 2200/0406* (2013.01); *F02D 2200/101* (2013.01); *F02D 2200/703* (2013.01); *F02D 2250/34* (2013.01); *Y02T 10/144* (2013.01); *Y02T 10/42* (2013.01)

(58) Field of Classification Search
CPC ............. F02D 41/18; F02D 2200/0406; F02D 2201/101; F02D 2250/34; Y02T 10/144; Y02T 10/42
USPC ................ 60/611, 605.1, 602; 701/102–104
See application file for complete search history.

(56) References Cited

U.S. PATENT DOCUMENTS

| | | | | |
|---|---|---|---|---|
| 9,261,031 | B2 * | 2/2016 | Watanuki | F02D 41/0007 |
| 2013/0131961 | A1 * | 5/2013 | Ibuki | F02D 41/0007 701/103 |
| 2013/0282256 | A1 | 10/2013 | Watanuki et al. | |
| 2015/0113983 | A1 * | 4/2015 | Yokono | F02D 41/0007 60/605.1 |
| 2015/0240731 | A1 * | 8/2015 | Yokono | F02D 41/0007 60/611 |
| 2017/0030260 | A1 * | 2/2017 | Nishio | F02D 41/0007 |

FOREIGN PATENT DOCUMENTS

| | | |
|---|---|---|
| JP | 5420013 B2 | 2/2014 |
| JP | 2017089583 A * | 5/2017 |

* cited by examiner

FIG. 7

| | TITLE | CALCULATION EQUATION | SETTING METHOD | CONTROL UNIT TO BE UTILIZED |
|---|---|---|---|---|
| MAP1 | PRESSURE ADDITION VALUE MAP | KP2 = MAP1(Ect, Ne) | SETTING BY DESK-TOP DESIGNING | TARGET SUPERCHARGING PRESSURE CALCULATION UNIT 131 |
| MAP2 | PRESSURE RATIO CORRECTION COEFFICIENT MAP | F1 = MAP2(P2/P1) | SETTING THROUGH THEORETICAL EQUATION | TARGET COMPRESSOR DRIVING FORCE CALCULATION UNIT 132 |
| MAP3 | ADIABATIC EFFICIENCY CALCULATION MAP | $\eta_c$ = MAP3(Qa, P2/P1) | SETTING THROUGH EXPERIMENTAL DATA ON SUPERCHARGER (COMPRESSOR) ITSELF | |
| MAP4 | TURBINE FLOW RATE MAP | Qt = MAP4(Pt) | SETTING THROUGH EXPERIMENTAL DATA ON SUPERCHARGER (TURBINE) ITSELF | TARGET TURBINE FLOW RATE CALCULATION UNIT 133 |
| MAP5 | TURBINE PRESSURE RATIO MAP | P3/P4 = MAP5(Pt) | SETTING THROUGH EXPERIMENTAL DATA ON SUPERCHARGER (TURBINE) ITSELF | TARGET BEFORE/AFTER-TURBINE PRESSURE RATIO CALCULATION UNIT 136 |
| MAP6 | TURBINE-DOWNSTREAM PRESSURE RATIO MAP | P4/P1 = MAP6(Qex) | SETTING THROUGH EXPERIMENTAL DATA ON ENGINE (NOT DEPENDING ON SPECIFICATION OF SUPERCHARGER) | TARGET TURBINE-UPSTREAM PRESSURE CALCULATION UNIT 137 |
| MAP7 | FLOW RATE CORRECTION COEFFICIENT MAP | $\sigma 3$ = MAP7(P3/P4) | SETTING THROUGH THEORETICAL EQUATION | |
| MAP8 | EXHAUST GAS TEMPERATURE MAP | T3 = MAP8(Ec, Ne) | SETTING THROUGH EXPERIMENTAL DATA ON ENGINE (NOT DEPENDING ON SPECIFICATION OF SUPERCHARGER) | |
| MAP9 | SONIC VELOCITY MAP | a3 = MAP9(T3) | SETTING THROUGH THEORETICAL EQUATION | TARGET GATE EFFECTIVE OPENING AREA CALCULATION UNIT 138 |
| MAP10 | EFFECTIVE OPENING AREA MAP | WG = MAP10(Swg) | SETTING THROUGH EXPERIMENTAL DATA ON SUPERCHARGER (VALVE, ACTUATOR) ITSELF | GATE VALVE CONTROL VALUE CALCULATION UNIT 139 |

CONTROLLER FOR SUPERCHARGER-EQUIPPED INTERNAL COMBUSTION ENGINE AND CONTROL METHOD THEREOF

INCORPORATION BY REFERENCE

The disclosure of Japanese Patent Application No. 2015-163411 filed on Aug. 21, 2015 including its specification, claims and drawings, is incorporated herein by reference in its entirety.

BACKGROUND OF THE INVENTION

The present invention relates to a controller for an internal combustion engine equipped with a supercharger having an actuator for driving a wastegate valve and to a control method thereof.

Description of the Related Art

To date, there has been known a supercharger for mounting a compressor, which rotates and drives a turbine with exhaust gas, in an intake path of an internal combustion engine for the purpose of increasing the output of the internal combustion engine.

Because its supercharging pressure increases more than necessary in the state of a high rotation speed and a high load and hence the internal combustion engine may be broken, the supercharger, in general, has an exhaust gas bypass that bypasses the turbine; the supercharging pressure is controlled at an appropriate level in such a way that a wastegate valve provided in the exhaust gas bypass is opened so that part of exhaust gas is made to enter the exhaust gas bypass in a ramifying manner and hence the amount of the exhaust gas flowing into the turbine is adjusted (e.g., refer to Japanese Patent Application No. JP-A-H09-228848).

As described above, the exhaust pressure and the supercharging pressure of the supercharger are controlled based on the opening degree of the wastegate valve. The control amount of the wastegate valve is determined through closed-loop control or simple open-loop control of an intake-system target amount (e.g., a target supercharging pressure or a target intake amount) to be set based on the rotation speed and the load of the internal combustion engine.

Meanwhile, in recent years, there has been proposed an internal combustion engine controller in which as the output target value of an internal combustion engine, the output axle torque of the internal combustion engine, which is a demanded value of driving force demanded by a driver or from the vehicle side, is utilized and then the air amount, the fuel amount, and the ignition timing, which are control amounts of the internal combustion engine, are determined so that an excellent traveling performance can be obtained. Moreover, it is known that among control amounts for an internal combustion engine, an air amount is a most influential control amount for the output axle torque of the internal combustion engine; thus, there has been provided an internal combustion engine controller that accurately controls air amount (e.g., refer to Japanese Patent Application No. JP-A-2009-013922).

Furthermore, there has been proposed a method in which the conventional wastegate valve control apparatus disclosed in JP-A-H09-228848 is applied to an internal combustion engine controller, such as the one disclosed in JP-A-2009-013922, that determines the output target value of an internal combustion engine. For example, in the technology disclosed in Japanese Patent No. JP-5420013, a target intake air flow rate (≈ a target charging efficiency) is calculated based on the output target value of an internal combustion engine; a target supercharging pressure is calculated based on the target charging efficiency and the rotation speed; based on the target intake air flow rate and the target supercharging pressure, a target compressor driving force required for driving the supercharger is calculated; then, by use of the characteristic (FIG. 9 in JP-5420013) that the relationship between the exhaust gas flow rate and the compressor driving force (the turbine output) changes in accordance with the control value for the actuator of the wastegate valve, a target control value for the actuator of the wastegate valve is calculated based on the exhaust gas flow rate and the target compressor driving force.

SUMMARY OF THE INVENTION

However, the technology disclosed in JP-5420013 utilizes the characteristic that the relationship between the exhaust gas flow rate and the compressor driving force changes in accordance with the control value for the actuator of the wastegate valve; therefore, because in order to obtain the characteristic, it is required to perform an experiment while the internal combustion engine and the supercharger are combined and to create a map and an approximation equation that represent the characteristic, man-hours for data measurement and matching are required. In addition, in the case where in an internal combustion engine of a single and the same specification, the supercharger is replaced by a supercharger of another specification, or in the case where a supercharger of a single and the same specification is utilized in an internal combustion engine of another specification, it is required to perform again the data measurement and the matching while the internal combustion engine and the supercharger, the specifications of which have been changed, are combined. That is to say, even in the case where only one of the specifications of the internal combustion engine and the supercharger is changed, it is required to perform again an overall experiment for the internal combustion engine and the supercharger; therefore, there has been a problem that the man-hours for data measurement and matching cannot be reduced.

The present invention has been implemented in order to solve the foregoing problems; the objective thereof is to provide a controller for a supercharger-equipped internal combustion engine and its control method that can reduce man-hours for data measurement and matching, which are required to perform while the internal combustion engine and the supercharger are combined.

A controller for an internal combustion engine equipped with a supercharger according to the present invention is equipped with a supercharger having a turbine provided in an exhaust path, a compressor that is provided at the upstream side of a throttle valve in an intake path and rotates integrally with the turbine, a wastegate valve provided in a bypass path, of the exhaust path, that bypasses the turbine, and a gate valve actuator that drives the wastegate valve; the controller for an internal combustion engine equipped with a supercharger includes a driving-condition detector that detects a real rotation speed and a real intake air flow rate of the internal combustion engine and a real atmospheric pressure, an intake air controller that calculates a target intake air flow rate and a target charging efficiency of the internal combustion engine, a target supercharging pressure calculator that calculates a target supercharging pressure, which is a target value of a supercharging pressure that is the pressure at a position, in the intake path portion, that is at the downstream side of the compressor and at the upstream side of the throttle valve, based on the target charging efficiency and the real rotation speed, a target compressor driving force calculator that calculates a target compressor driving force, which is a target value of driving force for the compressor, based on at least one of the target intake air flow rate and a target before/after-compressor pressure ratio, which is a pressure ratio of the target supercharging pressure and the real atmospheric pressure, a target turbine flow rate calculator that calculates a target turbine flow rate, for realizing the target compressor driving force, that is the flow rate of exhaust gas that flows through the turbine, an exhaust gas flow rate calculator that calculates an exhaust gas flow rate that is exhausted from the internal combustion engine, based on the real intake air flow rate and an air-fuel ratio of the internal combustion engine, a target gate flow rate calculator that calculates a target wastegate flow rate, which is a target value of a flow rate of exhaust gas that flows into the bypass path through the wastegate valve, based on the exhaust gas flow rate and the target turbine flow rate, a target before/after-turbine pressure ratio calculator that calculates a target before/after-turbine pressure ratio, for realizing the target compressor driving force or the target before/after-compressor pressure ratio, that is the ratio of a pressure before the turbine and a pressure after the turbine, a target turbine-upstream pressure calculator that calculates a turbine-downstream pressure, based on the exhaust gas flow rate, and then calculates a target turbine-upstream pressure, which is a target value of a turbine-upstream pressure, based on said turbine-downstream pressure and the target before/after-turbine pressure ratio, a target gate effective opening area calculator that calculates a target gate effective opening area, which is a target value of an effective opening area of the wastegate valve, based on the target wastegate flow rate, the target before/after-turbine pressure ratio, and the target turbine-upstream pressure, and a gate valve control value calculator that calculates a gate valve control value, which is a control value for the gate valve actuator, based on the target gate effective opening area, and performs driving control of the wastegate valve based on the gate valve control value.

A control method for an internal combustion engine equipped with a supercharger according to the present invention is for an internal combustion engine equipped with a supercharger having a turbine provided in an exhaust path, a compressor that is provided at the upstream side of a throttle valve in an intake path and rotates integrally with the turbine, a wastegate valve provided in a bypass path, of the exhaust path, that bypasses the turbine, and a gate valve actuator that drives the wastegate valve, the control method for an internal combustion engine equipped with a supercharger includes a driving-condition detecting that detects a real rotation speed and a real intake air flow rate of the internal combustion engine and a real atmospheric pressure, an intake air controlling that calculates a target intake air flow rate and a target charging efficiency of the internal combustion engine, a target supercharging pressure calculating that calculates a target supercharging pressure, which is a target value of a supercharging pressure that is the pressure at a position, in the intake path portion, that is at the downstream side of the compressor and at the upstream side of the throttle valve, based on the target charging efficiency and the real rotation speed, a target compressor driving force calculating that calculates a target compressor driving force, which is a target value of driving force for the compressor, based on at least one of the target intake air flow rate and a target before/after-compressor pressure ratio, which is a pressure ratio of the target supercharging pressure and the real atmospheric pressure, a target turbine flow rate calculating that calculates a target turbine flow rate, for realizing the target compressor driving force, that is the flow rate of exhaust gas that flows through the turbine, an exhaust gas flow rate calculating that calculates an exhaust gas flow rate that is exhausted from the internal combustion engine, based on the real intake air flow rate and an air-fuel ratio of the internal combustion engine, a target gate flow rate calculating that calculates a target wastegate flow rate, which is a target value of a flow rate of exhaust gas that flows into the bypass path through the wastegate valve, based on the exhaust gas flow rate and the target turbine flow rate, a target before/after-turbine pressure ratio calculating that calculates a target before/after-turbine pressure ratio, for realizing the target compressor driving force or the target before/after-compressor pressure ratio, that is the ratio of a pressure before the turbine and a pressure after the turbine, a target turbine-upstream pressure calculating that calculates a turbine-downstream pressure, based on the exhaust gas flow rate, and then calculates a target turbine-upstream pressure, which is a target value of a turbine-upstream pressure, based on said turbine-downstream pressure and the target before/after-turbine pressure ratio, a target gate effective opening area calculating that calculates a target gate effective opening area, which is a target value of an effective opening area of the wastegate valve, based on the target wastegate flow rate, the target before/after-turbine pressure ratio, and the target turbine-upstream pressure, and a gate valve control value calculating that calculates a gate valve control value, which is a control value for the gate valve actuator, based on the target gate effective opening area, and performs driving control of the wastegate valve based on the gate valve control value.

In the controller for an internal combustion engine equipped with a supercharger and the control method therefor according to the present invention, calculations of control values can be implemented by use of the characteristic of the internal combustion engine, which does not depend on the characteristic of the supercharger itself or the specification of the supercharger. Accordingly, even in the case where in an internal combustion engine with a single and the same specification, the supercharger is replaced by another one with a different specification or a supercharger with a single and the same specification is utilized in another internal combustion engine with a different specification, it is not required to perform data measurement and matching again while the internal combustion engine and the supercharger are combined with each other and hence the characteristic of the supercharger itself or the characteristic of the internal combustion engine can be utilized; as a result, the man-hours for data measurement and matching can be reduced.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 7 is a table for explaining a map utilized in the wastegate valve control unit according to Embodiment 1 of the present invention.

DETAILED DESCRIPTION OF THE EMBODIMENTS

Embodiment 1

Figure 1:
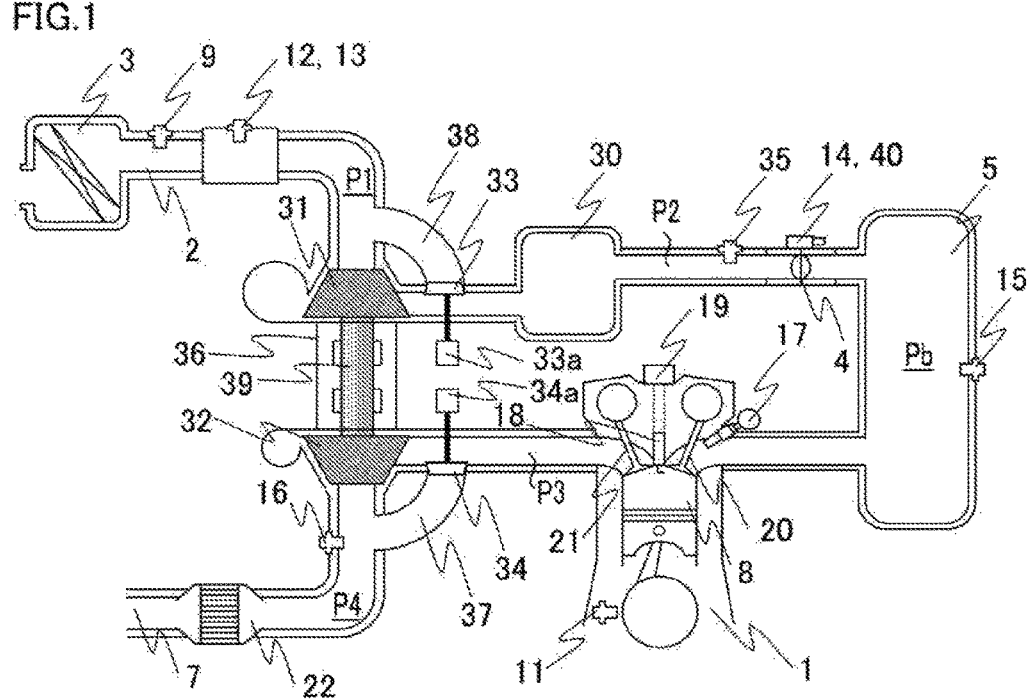
FIG. 1 is a schematic configuration diagram of a supercharger-equipped internal combustion engine according to Embodiment 1 of the present invention.
Figure 2:
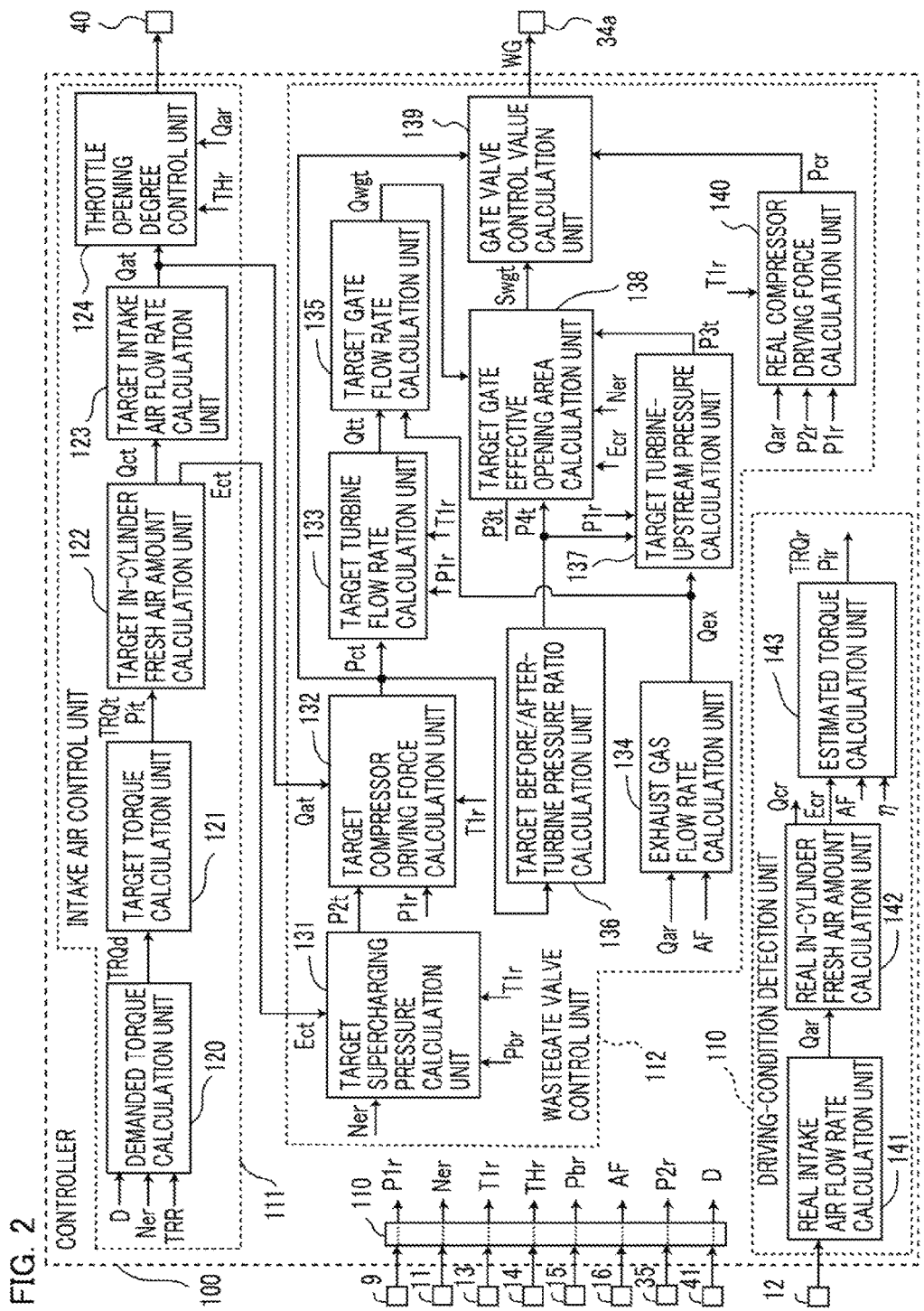
FIG. 2 is a block diagram of a controller for the supercharger-equipped internal combustion engine according to Embodiment 1 of the present invention.
Figure 3:
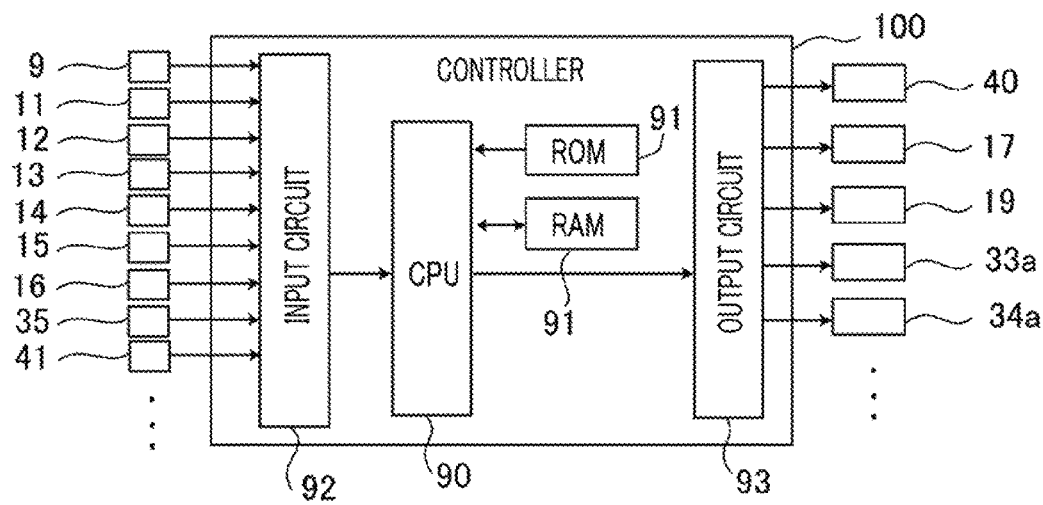
FIG. 3 is a hardware configuration diagram of the controller for the supercharger-equipped internal combustion engine according to Embodiment 1 of the present invention.

A controller 100 for an internal combustion engine 1 equipped with a supercharger 36 (hereinafter, referred to simply as the controller 100) according to Embodiment 1 will be explained with reference to drawings. FIG. 1 is a schematic configuration diagram of the internal combustion engine 1 (hereinafter, referred to as the engine 1) equipped with the supercharger 36; FIG. 2 is a block diagram of the controller 100 according to Embodiment 1.

1. The Configuration of the Engine 1

At first, the configuration of the engine 1 will be explained. As illustrated in FIG. 1, the engine 1 has a cylinder 8 in which a fuel-air mixture is combusted. The engine 1 and the controller 100 are mounted in a vehicle; the engine 1 functions as a driving force source for the vehicle (wheels). The engine 1 has an intake path 2 for supplying air to the cylinder 8 and an exhaust path 7 for discharging exhaust gas from the cylinder 8. The intake path 2 is formed of an intake pipe and the like; the exhaust path 7 is formed of an exhaust pipe and the like. The intake path 2 has an intake manifold 5 for supplying air to the respective cylinders 8. A throttle valve 4 is provided at a position, in the intake path 2, that is at the upstream side of the intake manifold 5. Accordingly, the intake path 2 at the downstream side of the throttle valve 4 is formed of the intake manifold 5. The engine 1 has the supercharger 36.

The supercharger 36 includes a turbine 32 provided in an exhaust path 7, a compressor 31 that is provided at a position, in the intake path 2, that is at the upstream side of the throttle valve 4, and rotates integrally with the turbine 32, a bypass 37 (hereinafter, referred to as an exhaust gas bypass 37), of the exhaust path 7, that bypasses the turbine 32, a wastegate valve 34 provided in the exhaust gas bypass 37, and a gate valve actuator 34a that drives the wastegate valve 34. The exhaust gas bypass 37 is a flow path that bypasses the turbine 32 and connects the portion, of the exhaust path 7, that is at the upstream side of the turbine 32 with the portion, of the exhaust path 7, that is at the downstream side of the turbine 32. The wastegate valve 34 is a valve for changing the flow path area (opening degree) of the exhaust gas bypass 37.

When exhaust gas drives and rotates the turbine 32, the compressor 31 rotates integrally with the turbine 32, compresses air in the intake path 2, and transmits the air to the cylinder 8. The turbine 32 and the compressor 31 are coupled with each other by a turbine shaft 39 in such a way as to integrally rotate on the same axis. When the opening degree of the wastegate valve 34 is increased through the gate valve actuator 34a, out of the flow rate of exhaust gas to be exhausted from the engine 1 (cylinder 8), a wastegate flow rate Qwg, which is the flow rate of part of the exhaust gas, which bypasses the turbine 32 and flows into the exhaust gas bypass 37, increases. In contrast, a turbine flow rate Qt, which is the flow rate of part of the exhaust gas, which flows into the turbine 32, decreases. Accordingly, the rotation driving forces of the turbine 32 and the compressor 31 are weakened. The gate valve actuator 34a is an electric one that changes the opening degree of the wastegate valve 34 through the rotation driving force of an electric motor. The gate valve actuator 34a may be a pressure-type one in which a diaphragm is supplied with a pressure obtained by reducing a supercharging pressure P2 by a decompression amount adjusted through a solenoid valve and then the driving force of the diaphragm changes the opening degree of the wastegate valve 34.

In Embodiment 1, the supercharger 36 includes a bypass 38 (hereinafter, referred to as an air bypass 38), of the intake path 2, that bypasses the compressor 31, an air bypass valve 33 provided in the air bypass 38, and a bypass valve actuator 33a that drives the air bypass valve 33. The bypass valve actuator 33a is a pressure-type one having a diaphragm that is actuated by the pressure difference between the supercharging pressure P2 and a manifold pressure Pb. When the supercharging pressure P2 increases to exceed a predetermined pressure difference from the manifold pressure Pb, the diaphragm is activated and hence the air bypass valve 33 is opened; thus, the upstream side and the downstream side of the compressor 31 are connected. Accordingly, it is made possible to prevent mechanical damage to an intake pipe or the like caused by an abnormal rise of the supercharging pressure P2 at a time when the accelerator pedal is released. While an after-mentioned wastegate valve control unit 112 controls the opening degree of the wastegate valve 34, the air bypass valve 33 is basically closed.

An air cleaner 3 for purifying taken-in outer air is mounted at the most upstream side of the intake path 2. At a position that is at the downstream side (the side closer to the cylinder 8) of the air cleaner 3 in the intake path 2 and at the upstream side of the compressor 31, an air flow sensor 12, which generates an electric signal corresponding to an intake air flow rate Qa, and an intake-air temperature sensor 13, which generates an electric signal corresponding to an intake-air temperature T1 in the intake path 2, are provided, as discrete components or as an integrated component (as an integrated component, in this example). An atmospheric pressure sensor 9, which generates an electric signal corresponding to an atmospheric pressure P1, is provided at the downstream side of the air cleaner 3 in the intake path 2 and at the upstream side of the compressor 31. The pressure at the upstream side of the compressor 31 can be regarded as equal to the atmospheric pressure P1. The atmospheric pressure sensor 9 may be contained in the controller 100.

An exhaust gas purification catalyst 22 is provided at the downstream side of the turbine 32 in the exhaust path 7. At a position that is at the downstream side of the turbine 32 in the exhaust path 7 and the upstream side (the side closer to the cylinder 8) of the exhaust gas purification catalyst 22, there is provided an air-fuel ratio sensor 16 that generates an electric signal corresponding to an air-fuel ratio AF, which is the ratio of air to fuel in a combustion gas.

An intercooler 30 for cooling compressed air is provided at the downstream side of the compressor 31 in the intake path 2. The throttle valve 4 for adjusting an air amount to be taken in by the engine 1 is provided at the downstream side of the intercooler 30. The throttle valve 4 is opened or closed by a throttle motor (a motor for driving the throttle valve) 40. The throttle valve 4 is connected with a throttle position sensor 14 that generates an electric signal corresponding to a throttle opening degree, which is the opening degree of the throttle valve 4. In a supercharging intake path, which is part, of the intake path 2, that is at downstream side of the compressor 31 and at the upstream side of the throttle valve 4, there is provided a supercharging pressure sensor 35 that generates an electric signal corresponding to the supercharging pressure P2, which is the pressure of air in the supercharging intake path.

The part, of the intake path 2, that is at the downstream side of the throttle valve 4 constitutes the intake manifold 5, which functions also as a surge tank for suppressing an intake-air ripple. A manifold pressure sensor 15 that generates an electric signal corresponding to the manifold pressure Pb, which is the pressure of air in the intake manifold 5, is provided in the intake manifold 5. Unlike Embodiment 1 in which both the air flow sensor 12 and the manifold pressure sensor 15 are provided, the supercharger-equipped internal combustion engine may be provided only with the manifold pressure sensor 15 but with no air flow sensor 12. In the case where only the manifold pressure sensor 15 is provided, it may be allowed that the intake-air temperature sensor 13 is provided in the intake manifold 5 so as to detect the intake-air temperature inside the intake manifold 5.

An injector 17 for injecting a fuel is provided at the downstream side (the side closed to the cylinder 8) of the intake manifold 5. The injector 17 may be provided in such a way as to inject a fuel directly into the cylinder 8.

In the top portion of the cylinder 8, there are provided an ignition plug 18 for igniting an inflammable fuel-air mixture produced by mixing air taken into the cylinder 8 with a fuel injected from the injector 17 and an ignition coil 19 for generating energy with which the ignition plug 18 throws sparks. There are also provided an intake valve 20 for adjusting intake air amount to be taken from the intake path 2 into the cylinder 8 and an exhaust valve 21 for adjusting exhaust gas amount to be exhausted from the cylinder 8 to the exhaust path 7. On the crankshaft of the engine 1, there is provided a crank angle sensor 11 for generating an electric signal corresponding to the rotation angle of the engine 1.

2. The Configuration of the Controller 100

Next, the configuration of the controller 100 will be explained.

The controller 100 is a controller whose control subject is the engine 1 equipped with the supercharger 36. Respective control units 110 through 112 and the like provided in the controller 100 are realized by a processing circuit included in the controller 100. In Embodiment 1, as illustrated in FIG. 1, the controller 100 includes, as a processing circuit, a computing processing unit (computer) 90 such as a CPU (Central Processing Unit), storage apparatuses 91 that exchange data with the computing processing unit 90, an input circuit 92 that inputs external signals to the computing processing unit 90, an output circuit 93 that outputs signals from the computing processing unit 90 to the outside, and the like. As the storage apparatuses 91, there are provided a RAM (Random Access Memory) that can read data from and write data in the computing processing unit 90, a ROM (Read Only Memory) that can read data from the computing processing unit 90, and the like. The input circuit 92 is connected with various kinds of sensors and switches and is provided with an A/D converter, an input port, and the like for inputting output signals from the sensors and the switches to the computing processing unit 90. The output circuit 93 is connected with electric loads and is provided with a driving circuit, an output port, and the like for outputting a control signal from the computing processing unit 90. In addition, the computing processing unit 90 runs software items (programs) stored in the storage apparatus 91 such as a ROM and collaborates with other hardware devices in the controller 100, such as the storage apparatus 91, the input circuit 92, and the output circuit 93, so that the respective functions of the control units 110 through 112 included in the controller 100 are realized. Setting data items such as maps to be utilized in the control units 110 through 112 are stored, as part of software items (programs), in the storage apparatus 91 such as a ROM.

In Embodiment 1, the input circuit 92 is connected with various kinds of sensors such as the atmospheric pressure sensor 9, the crank angle sensor 11, the air flow sensor 12, the intake-air temperature sensor 13, the throttle position sensor 14, the manifold pressure sensor 15, the air-fuel ratio sensor 16, the supercharging pressure sensor 35, and an accelerator position sensor 41 for generating an electric signal corresponding to an accelerator operating amount. The output circuit 93 is connected with various kinds of actuators such as the throttle motor 40, the injector 17, the ignition coil 19, the bypass valve actuator 33a, and the gate valve actuator 34a. Although not illustrated, the input circuit 92 is connected with a sensor for controlling the combustion in the engine 1 and sensors for controlling the behavior of the vehicle (e.g., a vehicle speed sensor, a water temperature sensor, and the like).

As basic control, the controller 100 calculates the fuel injection amount and the ignition timing, based on inputted output signals and the like from the various kinds of sensors so as to perform driving control of a fuel injection apparatus, an ignition apparatus, and the like (unillustrated). Although the details will be explained later, based on the output signal of the accelerator position sensor 41 and the like, the controller 100 calculates a demanded output torque demanded on the engine 1, and then controls the throttle valve 4, the wastegate valve 34, and the like so that an intake air amount for realizing the demanded output torque is obtained.

2-1. Driving-Condition Detection Unit 110

The controller 100 is provided with a driving-condition detection unit 110 (corresponding to a driving-condition detector) that detects the driving conditions of the engine 1 and the vehicle. The driving-condition detection unit 110 detects a real rotation speed Ner of the engine 1, a real intake air flow rate Qar, and a real atmospheric pressure P1r. Specifically, the driving-condition detection unit 110 detects the real rotation speed Ner of the engine 1, based on the output signal of the crank angle sensor 11, detects the real intake air flow rate Qar of the engine 1, based on the output signal of the air flow sensor 12 or the manifold pressure sensor 15, and detects the real atmospheric pressure P1r, based on the output signal of the atmospheric pressure sensor 9.

In addition to the foregoing driving conditions, the driving-condition detection unit 110 detects various kinds of driving conditions such as a real intake air temperature T1r, a real throttle opening degree THr, a real manifold pressure Pbr, an exhaust gas air-fuel ratio AF, a real supercharging pressure P2r, and an accelerator opening degree D. Specifically, the driving-condition detection unit 110 detects the real intake air temperature T1r, based on the output signal of the intake-air temperature sensor 13, detects the real throttle opening degree THr, based on the output signal of the throttle position sensor 14, detects the real manifold pressure Pbr, based on the output signal of the manifold pressure sensor 15, detects the exhaust gas air-fuel ratio AF, based on the output signal of the air-fuel ratio sensor 16, detects the real supercharging pressure P2r, based on the output signal of the supercharging pressure sensor 35, and detects the accelerator opening degree D, based on the output signal of the accelerator position sensor 41.

<Real Intake Air Flow Rate Calculation Unit 141>

The driving-condition detection unit 110 is provided with a real intake air flow rate calculation unit 141. The real intake air flow rate calculation unit 141 calculates the real intake air flow rate Qar, which is the flow rate of air that is taken in by the engine 1 (the intake path 2). In Embodiment 1, based on an actually measured air flow rate Qr detected through the output signal of the air flow sensor 12 or the manifold pressure sensor 15 (in this example, the air flow sensor 12), the real intake air flow rate calculation unit 141 calculates, as the real intake airflow rate Qar[g/s], the average value of the actually measured air flow rate Qr in a stroke period ΔT (in this example, the interval of BTDC5degCA), as represented by the equation (1) below.

$$Qar = \Sigma Qr/N \quad (1)$$

where N denotes the number of sampling instances for the actually measured air flow rate Qr in the stroke period ΔT.

When detecting the actually measured air flow rate Qr, based on the real manifold pressure Pbr detected by the manifold pressure sensor 15, the driving-condition detection unit 110 calculates the actually measured air flow rate Qr by use of an orifice flow rate calculation equation represented by the equation (14) or the like.

<Real In-Cylinder Fresh Air Amount Calculation Unit 142>

The driving-condition detection unit 110 is provided with a real in-cylinder fresh air amount calculation unit 142. Based on the output signal of the air flow sensor 12 or the manifold pressure sensor 15 (in this example, the air flow sensor 12), the real in-cylinder fresh air amount calculation unit 142 calculates a real charging efficiency Ecr and a real in-cylinder fresh air amount Qcr.

In Embodiment 1, as represented in the equation (2) below, the real in-cylinder fresh air amount calculation unit 142 applies first-order-lag filter processing, which simulates a delay in the intake manifold 5 (surge tank), to the value obtained by multiply the real intake air flow rate Qar by the stroke period ΔT (in this example, the interval of BTDC5degCA), in order to calculate the real in-cylinder fresh air amount Qcr per stroke [g/stroke].

$$Qcr(n) = KCCA \times Qcr(n-1) + (1-KCCA) \times Qar(n) \times \Delta T(n) \quad (2)$$

where KCCA is a filter coefficient.

Alternatively, it may be allowed that as represented in the equation (3) below, the real in-cylinder fresh air amount calculation unit 142 calculates the volume of air, in the intake manifold 5, that has been taken in by the cylinder 8, by multiplying a volumetric efficiency Kv on the basis of the intake manifold 5 by a cylinder volume Vc, and then multiplies the calculated air volume by an air density ρh, which is calculated based on the real manifold pressure Pbr and the real intake air temperature T1r, in order to calculate the real in-cylinder fresh air amount Qcr [g/stroke]. The volumetric efficiency Kv is the ratio of the volume of air, in the intake manifold 5, that is taken in by the cylinder 8, to the cylinder volume Vc (Kv=the volume of air in the intake manifold 5 taken in by the cylinder 8/Vc). By use of a map in which the relationship among the rotation speed Ne, the manifold pressure Pb, and the volumetric efficiency Kv is preliminarily set, the real in-cylinder fresh air amount calculation unit 142 calculates the volumetric efficiency Kv corresponding to the real rotation speed Ner and the real manifold pressure Pbr.

$$Qcr = (Kv \times Vc) \times \rho b, \rho b = Pbr/(R \times T1r) \quad (3)$$

where R is a gas constant.

The real in-cylinder fresh air amount calculation unit 142 calculates the real charging efficiency Ecr by dividing the real in-cylinder fresh air amount Qcr by a value obtained by multiplying the density ρ0 of air under the standard atmospheric condition by the cylinder volume Vc. The real charging efficiency Ecr is the ratio of the real in-cylinder fresh air amount Qcr to the density (ρ0×Vc) of air under the standard atmospheric condition, with which the cylinder volume Vc is filled. The standard atmospheric condition denotes the state of 1 atm and 25° C.

$$Ecr = Qcr/(\rho 0 \times Vc) \quad (4)$$

<Estimated Torque Calculation Unit 143>

Based on the real charging efficiency Ecr, the air-fuel ratio AF, and the thermal efficiency η, the estimated torque calculation unit 143 performs calculation for estimating real torque generated by the engine 1, i.e., calculates an estimated output torque TRQr of the engine 1 or an estimated indicated mean effective pressure Pir. In this situation, the air-fuel ratio AF may be the air-fuel ratio of exhaust gas, which is detected by the air-fuel ratio sensor 16, or may be a target value of the air-fuel ratio AF to be utilized for calculating the driving time for the injector 17.

In Embodiment 1, based on the real in-cylinder fresh air amount Qcr per stroke and the air-fuel ratio AF, the estimated torque calculation unit 143 calculates a fuel amount per stroke Qf [g], as represented in the equation (5) below.

$$Qf = Qcr/AF \quad (5)$$

Based on the heat generation amount per unit mass (e.g., approximately 44 [MJ/kg], in the case of gasoline) of a fuel to be utilized in the engine 1, the estimated torque calculation unit 143 calculates a heat generation amount Ht [J] from the fuel amount per stroke Qf, as represented in the equation (6) below.

$$Ht = Qf \times 44000 \quad (6)$$

The estimated torque calculation unit 143 calculates the thermal efficiency η [%] of the engine 1. The estimated torque calculation unit 143 calculates the thermal efficiency η corresponding to the real rotation speed Ner and the real charging efficiency Ecr, by use of a map in which the relationship among the rotation speed Ne, a charging efficiency Ec, and the thermal efficiency η is preliminarily set, based on experimental data preliminarily measured with regard to the engine 1. Based on the heat generation amount Ht and the thermal efficiency η, the estimated torque calculation unit 143 calculates a real indicated work Wi[j], which is work that combustion gas performs for the piston in the cylinder 8, as represented in the equation (7) below.

$$Wi = Ht \times \eta \quad (7)$$

As represented in the equation (8) below, the estimated torque calculation unit 143 divides the real indicated work Wi [J] by the cylinder volume Vc so as to calculate the estimated indicated mean effective pressure Pir [kPa].

$$Pir = Wd/Vc \quad (8)$$

By rearranging the equations (5) through (8), the equation (9) below is given.

$$Pir = Wd/Vc = (Ht \times \eta)/Vc = (Qf \times 44000 \times \eta)/Vc = \{(Qcr/AF) \times 44000 \times \eta\}/Vc \quad (9)$$

In this situation, when in the equation (9), the real in-cylinder fresh air amount Qcr is replaced by a target in-cylinder fresh air amount Qct and the estimated indicated mean effective pressure Pir is replaced by a target indicated mean effective pressure Pit, the equation (9) is expressed by the equation (10); by rearranging the equation (10) with regarding to the target in-cylinder fresh air amount Qct, the equation (12), described later, is given.

$$Pit = \{(Qct/AF) \times 44000 \times \eta\}/Vc \quad (10)$$

Then, based on the estimated indicated mean effective pressure Pir [kPa], the estimated torque calculation unit 143 calculates the estimated output torque TRQr [Nm], as represented in the equation (11) below. In the equation (11), z is the number of cylinders, and i is the number of rotations per cycle (e.g., i=2, in the case of a 4-stroke engine).

$$TRQr = Pir \times Vc \times z/(2\pi \times i) \quad (11)$$

As described above, by utilizing the real in-cylinder fresh air amount Qcr, the estimated output torque TRQr can accurately be calculated.

2-2. Intake Air Control Unit 111

The controller 100 is provided with an intake air control unit 111 (corresponding to an intake air controller) that controls intake air of the engine 1. The intake air control unit 111 calculates a target intake air flow rate Qat, which is a target value of the intake air flow rate Qa, and a target charging efficiency Ect, which is a target value of the charging efficiency Ec.

In Embodiment 1, the intake air control unit 111 includes a demanded torque calculation unit 120 that calculates a demanded output torque TRQd, which is the output torque demanded on the engine 1, a target torque calculation unit 121 that calculates a target output torque TRQt or the target indicated mean effective pressure Pit, based on the demanded output torque TRQd, a target in-cylinder fresh air amount calculation unit 122 that calculates the target charging efficiency Ect and the target in-cylinder fresh air amount Qct, based on the target output torque TRQt or the target indicated mean effective pressure Pit, a target intake air flow rate calculation unit 123 that calculates the target intake air flow rate Qat, based on the target in-cylinder fresh air amount Qct, and a throttle opening degree control unit 124 that controls the throttle opening degree, based on the target intake air flow rate Qat.

Hereinafter, the control units 120 through 124 in the intake air control unit 111 will be explained in detail.

<Demanded Torque Calculation Unit 120>

The demanded torque calculation unit 120 calculates the demanded output torque TRQd, based on the accelerator opening degree D and a demand from an external controller. Based on the real rotation speed Ner (or a traveling speed VS of the vehicle) and the accelerator opening degree D, the demanded torque calculation unit 120 calculates a driver-demanded output torque, which is an output torque, of the engine 1, that is demanded by the driver of the vehicle. Specifically, by use of a map in which the relationship among the real rotation speed Ner (or the traveling speed VS), the accelerator opening degree D, and the driver-demanded output torque is preliminarily set, the demanded torque calculation unit 120 calculates driver-demanded output torque corresponding to the real rotation speed Ner (or the traveling speed VS) and the accelerator opening degree D.

An external controller (e.g., a transmission controller, a brake controller, a controller for traction control, or the like) inputs an external demanded output torque TRR to the controller 100. In accordance with the driving condition, the demanded torque calculation unit 120 selects one of the driver-demanded output torque and the external demanded output torque TRR and then outputs the selected torque, as the demanded output torque TRQd. The demanded output torque TRQd denotes the demanded value of torque outputted from the crankshaft of the engine 1. It may be allowed that in order to change the acceleration-response characteristic of the vehicle, the demanded torque calculation unit 120 applies first-order-advance compensation or first-order-lag compensation to the demanded output torque TRQd.

<Target Torque Calculation Unit 121>

The target torque calculation unit 121 calculates the target output torque TRQt or the target indicated mean effective pressure Pit, based on the demanded output torque TRQd. The target torque calculation unit 121 calculates a load of an engine auxiliary apparatus corresponding to the real driving condition such as the real rotation speed Ner, by use of a map in which the relationship between the driving condition such as the rotation speed Ne and the load of the engine auxiliary apparatus is preliminarily set, based on experimental data obtained by measuring the respective loads of various kinds of engine auxiliary apparatuses (e.g., an alternator, an air conditioner compressor, a power steering pump, a transmission pump, a torque converter, and the like). The target torque calculation unit 121 adds the load (an absolute value) of an engine auxiliary apparatus to the demanded output torque TRQd so as to output an engine demanded output torque at a time when the load of an engine auxiliary apparatus is taken into consideration.

Next, the target torque calculation unit 121 calculates engine loss corresponding to the real driving condition such as the real rotation speed Ner, by use of a map in which the relationship between the driving condition such as the rotation speed Ne and the engine loss is preliminarily set, based on real data obtained by measuring mechanical loss inherent in the engine 1 and pumping loss (collectively, referred to as engine loss). Then, the target torque calculation unit 121 adds the engine loss (an absolute value) to the engine demanded output torque so as to calculate the target indicated mean effective pressure Pit to be produced in the cylinder 8. It may be allowed that the target torque calculation unit 121 calculates the target output torque TRQt, instead of the target indicated mean effective pressure Pit.

<Target In-Cylinder Fresh. Air Amount Calculation Unit 122>

The target in-cylinder fresh air amount calculation unit 122 calculates the target in-cylinder fresh air amount Qct and the target charging efficiency Ect, based on the target indicated mean effective pressure Pit or the target output torque TRQt. The target in-cylinder fresh air amount calculation unit 122 calculates the target in-cylinder fresh air amount Qct[g/stroke] and the target charging efficiency Ect, based on the target indicated mean effective pressure Pit or the target output torque TRQt, the target value of the air-fuel ratio AF, and the thermal efficiency η. As the thermal efficiency η, a thermal efficiency to be calculated by the estimated torque calculation unit 143, described above, is utilized. The cylinder volume Vc denotes a stroke volume [L] per one cylinder of the cylinder 8.

As represented in the equation (12) below, the target in-cylinder fresh air amount calculation unit 122 calculates the target in-cylinder fresh air amount Qct and the target charging efficiency Ect, based on the target indicated mean effective pressure Pit, the target value of the air-fuel ratio AF, and the thermal efficiency η. The equation (12) is derived from the equation (10) in such a manner as described above.

$$Qct = AF \times Pit \times Vc/(\eta \times 44000)$$

$$Ect = AF \times Pit/(\eta \times 44000 \times \rho 0) \qquad (12)$$

It is allowed that the target in-cylinder fresh air amount calculation unit 122 calculates the target charging efficiency Ect by dividing the target in-cylinder fresh air amount Qct by the preliminarily set mass (ρ0×Vc) of air with which the cylinder volume Vc is filled under the standard atmospheric condition. The target charging efficiency Ect and the target in-cylinder fresh air amount Qct are values that correlate to each other; based on the calculated value of one of them, the value of the other one is calculated.

<Target Intake Air Flow Rate Calculation Unit 123>

Based on the target in-cylinder fresh air amount Qct, the target intake air flow rate calculation unit 123 calculates the target intake air flow rate (amount) Qat[g/s] to be taken in by the engine 1 through the intake path 2. In Embodiment 1, as represented in the equation (13) below, the target intake air flow rate calculation unit 123 obtains a value by applying first-order advance filtering processing, which has a characteristic reverse to that of the foregoing first-order lag filtering processing represented in the equation (2), to the target in-cylinder fresh air amount Qct; then, the target intake air flow rate calculation unit 123 divides the obtained value by the stroke period ΔT so as to calculate the target intake air flow rate Qat. The target intake air flow rate Qat corresponds to the target value of the flow rate of air that passes through the intake path 2 (for example, the throttle valve 4) at the upstream side of the intake manifold 5 (the surge tank). In this example, the stroke period ΔT is set to in the interval of BTDC5degCA; in the case of a four-cylinder engine, the stroke period ΔT is the interval of 180degCA; in the case of a three-cylinder engine, the stroke period ΔT is the interval of 240degCA.

$$Qat(n) = \{1/(1-KCCA) \times Qct(n) - KCCA/(1-KCCA) \times Qct(n-1)\}/\Delta T(n) \qquad (13)$$

<Throttle Opening Degree Control Unit 124>

The throttle opening degree control unit 124 controls the throttle opening degree, based on the target intake air flow rate Qat. Based on the target intake air flow rate Qat, the throttle opening degree control unit 124 sets a target throttle opening degree THt and then applies driving control to the throttle motor 40 so that the real throttle opening degree THr approaches the target throttle opening degree THt.

In Embodiment 1, the throttle opening degree control unit 124 calculates the target throttle opening degree THt for realizing the target intake air flow rate Qat, by use of a fluid-mechanics theoretical formula, i.e., an orifice flow rate calculation equation for a compressible fluid, in which the flow in the vicinity of the throttle valve 4 is regarded as flows before and after a throttle valve.

The theoretical formula for the flow rate Qa[g/s] of intake air that flows through the throttle valve 4, regarded as a throttle valve, is derived as represented in the equation (14) below, from the energy conservation law, an isoentropic flow relational equation, a sonic velocity relational equation, and a state equation.

$$\frac{1}{2}Ue^2 + \frac{\kappa}{\kappa-1}\frac{Pe}{\rho e} = \frac{\kappa}{\kappa-1}\frac{P2}{\rho 2}, \frac{P}{\rho^\kappa} = Const., a = \sqrt{\kappa \cdot R \cdot T}, \qquad (14)$$

$$\rho = \frac{P}{R \cdot T}$$

$$\therefore Qa = \rho 2 \cdot a2 \cdot Sth \cdot \sigma 2$$

$$\because \sigma 2 = \sqrt{\frac{2}{\kappa-1}\left[\left(\frac{Pb}{P2}\right)^{\frac{2}{\kappa}} - \left(\frac{Pb}{P2}\right)^{\frac{\kappa+1}{\kappa}}\right]}$$

where κ, R, ρ, T, a, U, Sth, and Const. are a specific heat ratio, a gas constant, a density, a temperature, a sonic velocity, a flow rate, the effective opening area of the throttle valve 4, and a fixed value, respectively. The character σ2 is a flow rate correction coefficient that changes in accordance with the pressure ratio Pb/P2 of the flow at downstream side of (after) the throttle valve 4 to the flow at the upstream side of (before) the throttle valve 4. The character with "2" added thereafter denotes a variable at the upstream side of the throttle valve 4; the character with "b" added thereafter denotes a variable at the downstream side of the throttle valve 4 (in the intake manifold 5); the character with "e" added thereafter denotes a variable at the throttle valve 4.

The throttle opening degree control unit 124 calculates the flow rate correction coefficient σ2 corresponding to a real before/after-throttle pressure ratio Pbr/P2r, which is the pressure ratio of the real manifold pressure Pbr and the real supercharging pressure P2r, by use of a map in which the relationship between the flow rate correction coefficient σ2 and the before/after-throttle pressure ratio Pb/P2, which is the ratio of the manifold pressure Pb and the supercharging pressure P2, is preliminarily set based on the equation for the flow rate correction coefficient σ2 in the equation (14) above. The throttle opening degree control unit 124 calculates a sonic velocity a2 corresponding to the real intake air temperature T1r, by use of a map in which the relationship between the temperature T and the sonic velocity a is preliminarily set based on the equation for the sonic velocity a in the equation (14) above. By use of the equation for the density ρ in the equation (14) above, the throttle opening degree control unit 124 calculates the density ρ2, based on the real supercharging pressure P2r and the real intake air temperature T1r. As represented in the equation (15) below, the throttle opening degree control unit 124 divides the target intake air flow rate Qat by the flow rate correction coefficient σ2, the sonic velocity a2, and the density ρ2 so as to calculate a target throttle effective opening area Stht.

$$Stht = Qat/(\sigma 2 \times a2 \times \rho 2) \qquad (15)$$

The throttle opening degree control unit 124 calculates a throttle opening degree, as the target throttle opening degree THt, corresponding to the target throttle effective opening area Stht, by use of a map in which the relationship between the effective opening area Sth and the throttle opening degree is preliminarily set. Then, the throttle opening degree control unit 124 changes the control value for the throttle motor 40 so that the real throttle opening degree THr approaches the target throttle opening degree THt.

The throttle opening degree control unit 124 calculates a learning value for correcting the target throttle effective opening area Stht so that the real intake air flow rate Qar approaches the target intake air flow rate Qat. As a result, the target intake air flow rate Qat can accurately be achieved.

By controlling the intake air flow rate Qa in such a manner as described above, a torque demanded value from the driver or another controller can accurately be achieved.

2-3. Wastegate Valve Control Unit 112

The controller 100 is provided with the wastegate valve control unit 112 (corresponding to a wastegate valve controller). The wastegate valve control unit 112 performs driving control of the wastegate valve 34 so as to control the supercharging pressure P2. As illustrated in FIG. 2, the wastegate valve control unit 112 includes a target supercharging pressure calculation unit 131 (corresponding to a target supercharging pressure calculator), a target compressor driving force calculation unit 132 (corresponding to a target compressor driving force calculator), a target turbine flow rate calculation unit 133 (corresponding to a target turbine flow rate calculator), an exhaust gas flow rate calculation unit 134 (corresponding to an exhaust gas flow rate calculator), a target gate flow rate calculation unit 135 (corresponding to a target gate flow rate calculator), a target before/after-turbine pressure ratio calculation unit 136 (corresponding to a target before/after-turbine pressure ratio calculator), a target turbine-upstream pressure calculation unit 137 (corresponding to a target turbine-upstream pressure calculator), a target gate effective opening area calculation unit 138 (corresponding to a target gate effective opening area calculator), and a gate valve control value calculation unit 139 (corresponding to a gate valve control value calculator).

Based on the target charging efficiency Ect and the real rotation speed Ner, the target supercharging pressure calculation unit 131 calculates a target supercharging pressure P2t, which is the target value of the supercharging pressure P2 that is the pressure at a position, in the intake path 2, that is at the downstream side of the compressor 31 and at the upstream side of the throttle valve 4. Based on at least one of the target intake air flow rate Qat calculated by the intake air control unit 111 and a target before/after-compressor pressure ratio P2t/P1r, which is the pressure ratio of the target supercharging pressure P2t and the real atmospheric pressure P1r, the target compressor driving force calculation unit 132 calculates a target compressor driving force Pct, which is the target value of the driving force for the compressor 31. The target turbine flow rate calculation unit 133 calculates a target turbine flow rate Qtt, for realizing the target compressor driving force Pct, that is the flow rate of exhaust gas that flows through the turbine 32. Based on the real intake air flow rate Qar and the air-fuel ratio AF of the engine 1, the exhaust gas flow rate calculation unit 134 calculates an exhaust gas flow rate Qex that is exhausted from the engine 1 (cylinder 8). Based on the exhaust gas flow rate Qex and the target turbine flow rate Qtt, the target gate flow rate calculation unit 135 calculates a target wastegate flow rate Qwgt, which is the target value of the flow rate of exhaust gas that flows into the exhaust gas bypass 37 through the wastegate valve 34.

The target before/after-turbine pressure ratio calculation unit 136 calculates a target before/after-turbine pressure ratio P3t/P4t, for realizing the target compressor driving force Pct or the target before/after-compressor pressure ratio P2t/P1r, that is the ratio of the pressure before (at the upstream side of) the turbine 32 and the pressure after (at the downstream side of) the turbine 32. The target turbine-upstream pressure calculation unit 137 calculates a pressure P4 at the downstream side of the turbine 32 (hereinafter, referred to as a turbine-downstream pressure P4), based on the exhaust gas flow rate Qex; then, based on the turbine-downstream pressure P4 and the target before/after-turbine pressure ratio P3t/P4t, the target turbine-upstream pressure calculation unit 137 calculates a target turbine-upstream pressure P3t, which is the target value of pressure P3 at the upstream side of the turbine 32 (hereinafter, referred to as a turbine-upstream pressure P3). Based on the target wastegate flow rate Qwgt, the target before/after-turbine pressure ratio P3t/P4t, and the target turbine-upstream pressure P3t, the target gate effective opening area calculation unit 138 calculates a target gate effective opening area Swgt, which is the target value of an effective opening area Swg of the wastegate valve 34. Then, based on the target gate effective opening area Swgt, the gate valve control value calculation unit 139 calculates a gate valve control value WG, which is a control value WG for the gate valve actuator 34a, so as to perform driving control of the gate valve actuator 34a.

The characteristics utilized in the foregoing calculations by the control units 131 through 139 of the wastegate valve control unit 112 will be explained. When the calculation of the target supercharging pressure P2t, which is based on the target charging efficiency Ect and the real rotation speed Ner, is performed in the target supercharging pressure calculation unit 131, the basic characteristic of the engine 1, which does not depend on the specification of the supercharger 36, and desk-top-setting data can be utilized. When the calculation of the target compressor driving force Pct, which is based on at least one of the target intake air flow rate Qat and the target before/after-compressor pressure ratio P2t/P1r, is performed in the target compressor driving force calculation unit 132, the basic characteristic of the supercharger 36 (the compressor 31) itself, which has not been mounted in the engine 1, can be utilized. When the calculation of the target turbine flow rate Qtt for realizing the target compressor driving force Pct, is performed in the target turbine flow rate calculation unit 133, the basic characteristic of the supercharger 36 (the turbine 32) itself can be utilized. When the calculation of the exhaust gas flow rate Qex, which is based on the real intake air flow rate Qar and the air-fuel ratio AF, is performed in the exhaust gas flow rate calculation unit 134, the basic characteristic of the engine 1, which does not depend on the specification of the supercharger 36, can be utilized. When the calculation of the target wastegate flow rate Qwgt, which is based on the exhaust gas flow rate Qex and the target turbine flow rate Qtt, is performed in the target gate flow rate calculation unit 135, simple four arithmetic operations based on the mass conservation law can be utilized.

When the calculation of the target before/after-turbine pressure ratio P3t/P4t for realizing the target compressor driving force Pct or the target before/after-compressor pressure ratio P2t/P1r is performed in the target before/after-turbine pressure ratio calculation unit 136, the basic characteristic of the supercharger 36 itself, which has not been mounted in the engine 1, can be utilized. When the calculation of the turbine-downstream pressure P4, which is based on the exhaust gas flow rate Qex, is performed in the target turbine-upstream pressure calculation unit 137, the basic characteristic of the engine 1, which does not depend on the specification of the supercharger 36, can be utilized. When the calculation of the target turbine-upstream pressure P3t, which is based on the turbine-downstream pressure P4 and the target before/after-turbine pressure ratio P3t/P4t, is performed in the target turbine-upstream pressure calculation unit 137, simple four arithmetic operations can be utilized. When the calculation of the target gate effective opening area Swgt, which is based on the target wastegate flow rate Qwgt, the target before/after-turbine pressure ratio P3t/P4t, and the target turbine-upstream pressure P3t, is performed in the target gate effective opening area calculation unit 138, the basic characteristic of the supercharger 36 itself (the basic characteristics of the wastegate valve 34 and the exhaust gas bypass 37 themselves), which has (have) not been mounted in the engine 1, can be utilized. When the calculation of the gate valve control value WG, which is based on the target gate effective opening area Swgt, is performed in the gate valve control value calculation unit 139, the basic characteristic of the supercharger 36 itself (the basic characteristics of the wastegate valve 34 and the gate valve actuator 34a themselves), which has (have) not been mounted in the engine 1, can be utilized.

As described above, in the calculations by the control units 131 through 139 of the wastegate valve control unit 112, it is not required to utilize characteristics at a time when the engine 1 and the supercharger 36 are combined, and the basic characteristic of the supercharger 36 itself or the basic characteristic of the engine, which does not depend on the specification of the supercharger 36, can be utilized. Accordingly, in the case where in the engine 1 of a single and the same specification, the supercharger 36 is replaced by a supercharger of another specification, or in the case where the supercharger 36 of a single and the same specification is utilized in the engine 1 of another specification, it is not required to measure again the characteristics while the engine 1 and the supercharger 36 are combined; therefore, because the basic characteristic of the supercharger 36 itself or the basic characteristic of the engine 1 can be utilized, the work amount for matching can be reduced.

Hereinafter, the respective configurations of the control units of the wastegate valve control unit 112 will be explained in detail.

<Target Supercharging Pressure Calculation Unit 131>

The target supercharging pressure calculation unit 131 calculates the target supercharging pressure P2t, based on the target charging efficiency Ect and the real rotation speed Ner. In Embodiment 1, based on the real rotation speed Ner and the real manifold pressure Pbr, the target supercharging pressure calculation unit 131 calculates the volumetric efficiency Kv on the basis of the intake manifold 5; based on the volumetric efficiency KV, the target charging efficiency Ect, and the real intake air temperature T1r, the target supercharging pressure calculation unit 131 calculates a target manifold pressure Pbt, which is the target value of the pressure in the intake manifold 5; then, the target supercharging pressure calculation unit 131 adds a pressure addition value KP2 to the target manifold pressure Pbt so as to calculate the target supercharging pressure P2t. The volumetric efficiency Kv is a volumetric efficiency Kv on the basis of the volume of air in the intake manifold 5, i.e., the ratio of the volume of air, in the intake manifold 5, that is taken in by the cylinder 8, to the cylinder volume Vc (Kv=the volume of air, in the intake manifold 5, taken in by the cylinder 8/Vc). As is the case with the real in-cylinder fresh air amount calculation unit 142, the target supercharging pressure calculation unit 131 calculates the volumetric efficiency Kv corresponding to the real rotation speed Ner and the real manifold pressure Pbr, by use of a map in which the relationship among the rotation speed Nc, the manifold pressure Pb, and the volumetric efficiency Kv is preliminarily set. In Embodiment 1, the volumetric efficiency Kv calculated by the real in-cylinder fresh air amount calculation unit 142 is utilized.

As represented in the equation (16) below, based on the target charging efficiency Ect on the basis of the atmospheric air, the volumetric efficiency Kv on the basis of the intake manifold 5, and the real intake air temperature T1r, as an environmental correction, the target supercharging pressure calculation unit 131 calculates the target manifold pressure Pbt. Here, P10 denotes the atmospheric pressure P1 under the standard atmospheric condition (in this example, P10=1 atm); T10 denotes the intake-air temperature T1 under the standard atmospheric condition (in this example, T10=25° C.)

$$Pbt = P10 \cdot \frac{Ect}{Kv} \cdot \frac{T1}{T10} \qquad (16)$$

As represented in the equation (17) below, the target supercharging pressure calculation unit 131 calculates the pressure addition value KP2 corresponding to the target charging efficiency Ect and the real rotation speed Ner, by use of a pressure addition value map MAP1 in which the relationship among the target charging efficiency Ect, the rotation speed Ne, and the pressure addition value KP2 is preliminarily set. Then, the target supercharging pressure calculation unit 131 adds the pressure addition value KP2 to the target manifold pressure Pbt so as to calculate the target supercharging pressure P2t. The pressure addition value KP2 is for the purpose of securing the pressure difference between the pressure before the throttle valve 4 and the pressure after the throttle valve 4 and controlling the intake air flow rate Qa by the throttle valve 4. It may be allowed that a fixed value of approximately 5 [kPa] is set to the pressure addition value KP2.

$$P2t=Pbt+KP2$$

$$KP2=MAP1(Ect,Ner) \qquad (17)$$

In such a way as described above, the target supercharging pressure P2t necessary for achieving the target charging efficiency Ect can accurately be calculated.

<Target Compressor Driving Force Calculation Unit 132>

The target compressor driving force calculation unit 132 calculates the target compressor driving force Pct, based on at least one of (in this example, both) the target intake air flow rate Qat and the target before/after-compressor pressure ratio P2t/P1r, which is the pressure ratio of the target supercharging pressure P2t and the real atmospheric pressure P1r.

At first, the basic characteristics of the compressor 31 and the turbine 32 will be explained. Taking the mass conservation law, the polytropic change, and the adiabatic efficiency, which are physical laws regarding the state of air, into consideration, the turbine output Pt[W] and the compressor driving force Pc[W] are calculated through the theoretical equation (18) below.

$$Pt = Qt \cdot \eta t \cdot Wt =$$
$$Qt \cdot \eta t \cdot Cp \cdot T3\left(1 - \left(\frac{P4}{P3}\right)^{\frac{\kappa-1}{\kappa}}\right) = Qt \cdot \eta t \frac{\kappa}{\kappa-1} R \cdot T3\left(1 - \left(\frac{P4}{P3}\right)^{\frac{\kappa-1}{\kappa}}\right) \qquad (18)$$

-continued $$Pc = \frac{Qcmp \cdot Wc}{\eta c} = Qcmp \frac{1}{\eta c} Cp \cdot T1\left(\left(\frac{P2}{P1}\right)^{\frac{\kappa-1}{\kappa}} - 1\right) =$$

$$Qcmp \frac{1}{\eta c} \frac{\kappa}{\kappa-1} R \cdot T1\left(\left(\frac{P2}{P1}\right)^{\frac{\kappa-1}{\kappa}} - 1\right)$$

$$\because Cp = \frac{\kappa}{\kappa-1} R$$

where Cp is a constant-pressure specific heat[kJ/(kg·K)]; Wt is a turbine output[J] per unit flow rate; Wc is a compressor work [J] per unit flow rate; κ is a specific heat ratio; Qt is the mass flow rate[g/s] of exhaust gas that passes through the turbine 32; Qcmp is the Mass flow rate[g/s] of air that passes through the compressor 31; R is a gas constant[kJ/(kg·K)], ηt is the adiabatic efficiency of the turbine 32; ηc is the adiabatic efficiency of the compressor 31; T3 is the temperature of exhaust gas; P3 is the pressure at the upstream side of the turbine 32; P4 is the pressure at the downstream side of the turbine 32.

Because in the normal state, the air bypass valve 33 is basically closed and hence all the intake air (the intake air flow rate Qa) passes through the compressor 31, it can be assumed, in the equation (18) above, that the intake air flow rate Qa is equal to the compressor-passing flow rate Qcmp. Accordingly, the compressor driving force Pc can be calculated through the equation (19) below, by use of the intake air flow rate Qa, the before/after-compressor pressure ratio P2/P1, which is the ratio of the supercharging pressure P2 and the atmospheric pressure P1, and the intake-air temperature T1.

$$Pc = Qa \frac{1}{\eta c} \frac{\kappa}{\kappa-1} R \cdot T1\left(\left(\frac{P2}{P1}\right)^{\frac{\kappa-1}{\kappa}} - 1\right) \tag{19}$$

As represented in the equation (20) below, the target compressor driving force calculation unit 132 calculates the target compressor driving force Pct, based on the target intake air flow rate Qat, the target before/after-compressor pressure ratio P2t/P1r, which is the pressure ratio of the target supercharging pressure P2t and the real atmospheric pressure P1r, a target adiabatic efficiency ηct of the compressor 31, and the real intake air temperature T1r. Specifically, the target compressor driving force calculation unit 132 calculates a pressure ratio correction coefficient F1 corresponding to the target before/after-compressor pressure ratio P2t/P1r, which is the pressure ratio of the target supercharging pressure P2t and the real atmospheric pressure P1r, by use of a pressure ratio correction coefficient map MAP2 in which the relationship between the pressure ratio correction coefficient F1 and the before/after-compressor pressure ratio P2/P1, which is the pressure ratio of the supercharging pressure P2 and the atmospheric pressure P1, is preliminarily set, based on the theoretical equation (20) below.

$$Pct = Qat \frac{1}{\eta ct} T1r \cdot F1 \tag{20}$$

$$F1 = MAP2\left(\frac{P2t}{P1r}\right),$$

$$\because MAP2\left(\frac{P2}{P1}\right) \cong \frac{\kappa}{\kappa-1} R\left(\left(\frac{P2}{P1}\right)^{\frac{\kappa-1}{\kappa}} - 1\right)$$

As represented in the equation (21) below, the target compressor driving force calculation unit 132 calculates the target adiabatic efficiency ηct corresponding to the target intake air flow rate Qat and the target before/after-compressor pressure ratio P2t/P1r, by use of an adiabatic efficiency calculation map MAP3 in which the relationship among the intake air flow rate Qa, the before/after-compressor pressure ratio P2/P1, and the adiabatic efficiency ηc of the compressor 31 is preliminarily set. The adiabatic efficiency calculation map MAP3 can preliminarily be set based on experimental data measured on the supercharger 36 (the compressor 31) itself that has not been mounted in the engine 1. It may be allowed that the target compressor driving force calculation unit 132 calculates target compressor driving force Pct* without considering the change in the adiabatic efficiency, for example, by setting the target adiabatic efficiency ηct to a fixed value.

$$\eta ct = MAP3(Qat, P2t/P1r) \tag{21}$$

Depending on the characteristic of the supercharger 36, there occurs a case where the compressor driving force Pc can be calculated based on at least one of the intake air flow rate Qa and the before/after-compressor pressure ratio P2/P1; in that case, it may be allowed that the target compressor driving force Pct is calculated based on at least one of the target intake air flow rate Qat and the target before/after-compressor pressure ratio P2t/P1r.

In Embodiment 1, the target compressor driving force calculation unit 132 converts the target compressor driving force Pct calculated under the present environment into compressor driving force under the standard atmospheric condition. Specifically, as represented in the equation (22) below, the target compressor driving force calculation unit 132 multiplies the target compressor driving force Pct by an environment correction coefficient, calculated based on the real atmospheric pressure P1r and the real intake air temperature T1r, so as to calculate a target compressor driving force Pct0, which is the target compressor driving force Pc converted to the one under the standard atmospheric condition. In this example, the atmospheric pressure P10 under the standard atmospheric condition is set to 1 atm (P10=1 atm); the intake-air temperature T10 under the standard atmospheric condition is set to 25° C.=25° C.) The environmental correction is to convert compressor driving force into the one under the standard atmospheric condition, based on the law of similarity in which the effect of compressibility is considered; the compressor driving force to which the environmental correction has been applied is referred to also as a corrected compressor driving force.

$$Pct0 = Pct \frac{P10}{P1r} \sqrt{\frac{T10}{T1r}} \tag{22}$$

<Real Compressor Driving Force Calculation Unit 140>

In Embodiment 1, the wastegate valve control unit 112 is provided with the real compressor driving force calculation unit 140 (corresponding to a real compressor driving force calculator). Based on at least one of (in this example, both) the real intake air flow rate Qar and a real before/after-compressor pressure ratio P2r/P1r, which is the pressure ratio of the real supercharging pressure P2r and the real atmospheric pressure P1r, the real compressor driving force calculation unit 140 calculates a real compressor driving force Pcr, which is a real driving force for the compressor 31.

As represented in the after-mentioned equation (23) that is similar to the equation (20) above, the real compressor driving force calculation unit 140 calculates the real compressor driving force Pcr, based on the real intake air flow rate Qar, the real before/after-compressor pressure ratio P2r/P1r, which is the pressure ratio of the real supercharging pressure P2r and the real atmospheric pressure P1r, a real adiabatic efficiency ηcr of the compressor 31, and the real intake air temperature T1r. Specifically, as is the case with the target compressor driving force calculation unit 132, the real compressor driving force calculation unit 140 calculates a pressure ratio correction coefficient F1 corresponding to the real before/after-compressor pressure ratio P2r/P1r, which is the pressure ratio of the real supercharging pressure P2r and the real atmospheric pressure P1r, by use of a pressure ratio correction coefficient map MAP2 in which the relationship between the pressure ratio correction coefficient F1 and the before/after-compressor pressure ratio P2/P1 is preliminarily set.

$$Pcr = Qar \frac{1}{\eta cr} T1r \cdot F1 \qquad (23)$$

$$F1 = MAP2\left(\frac{P2r}{P1r}\right),$$

$$\because MAP2\left(\frac{P2}{P1}\right) \cong \frac{\kappa}{\kappa-1} R\left(\left(\frac{P2}{P1}\right)^{\frac{\kappa-1}{\kappa}} - 1\right)$$

As represented in the equation (24) below, the real compressor driving force calculation unit 140 calculates the real adiabatic efficiency ηcr corresponding to the real intake air flow rate Qar and the real before/after-compressor pressure ratio P2r/P1r, by use of the adiabatic efficiency calculation map MAP3 in which the relationship among the intake air flow rate Qa, the before/after-compressor pressure ratio P2/P1, and the adiabatic efficiency ηc of the compressor 31 is preliminarily set. As the adiabatic efficiency calculation map MAP3, a map the same as the map utilized by the target compressor driving force calculation unit 132 is utilized. It may be allowed that as is the case with the target compressor driving force calculation unit 132, the real compressor driving force calculation unit 140 calculates the real compressor driving force Pcr without considering the change in the adiabatic efficiency ηc, for example, by setting the real adiabatic efficiency ηcr to a fixed value.

$$\eta cr = MAP3(Qar, P2r/P1r) \qquad (24)$$

In such a manner as represented in the equation (22) above, the real compressor driving force calculation unit 140 multiplies the real compressor driving force Pcr under the present environment by an environment correction coefficient, calculated based on the real atmospheric pressure P1r and the real intake air temperature T1r, so as to calculate a real compressor driving force Pcr0, which is the real compressor driving force Pcr converted to the one under the standard atmospheric condition. As described above, the target compressor driving force Pct0 and the real compressor driving force Pcr0 under the standard atmospheric condition, for which environmental correction is considered, can accurately be calculated.

<Target Turbine Flow Rate Calculation Unit 133>

The target turbine flow rate calculation unit 133 calculates the target turbine flow rate Qtt for realizing the target compressor driving force Pct. In Embodiment 1, as represented in the equation (25) below, the target turbine flow rate calculation unit 133 calculates, as the target turbine flow rate Qtt, the turbine flow rate Qt corresponding to the target compressor driving force Pct (in this example, the target compressor driving force Pct0, which is the target compressor driving force Pct converted into the one under the standard atmospheric condition), by use of a turbine flow rate map MAP4 in which the relationship between the turbine flow rate Qt and the turbine output Pt, which is the driving force for the compressor 31, is preliminarily set. The turbine flow rate map MAP4 can preliminarily be set based on experimental data measured on the supercharger 36 (the turbine 32) itself that has not been mounted in the engine 1.

$$Qtt = MAP4(Pct) \qquad (25)$$

In this configuration, there exists a strong correlation between the turbine flow rate Qt and the turbine output Pt; therefore, the target turbine flow rate Qtt for realizing the target compressor driving force Pct can accurately be calculated. In more detail, in the equation (18), which is a theoretical equation for calculating the turbine output Pt, the turbine flow rate Qt and the before/after-turbine pressure ratio P3/P4 is utilized; however, because there exists a strong correlation between the turbine flow rate Qt and the before/after-turbine pressure ratio P3/P4, any one of the turbine flow rate Qt and the before/after-turbine pressure ratio P3/P4 can be omitted.

Specifically, because as the turbine flow rate Qt increases, the turbine-upstream pressure P3 increases, the before/after-turbine pressure ratio P3/P4 increases. As is the case with the adiabatic efficiency ηc of the compressor 31, explained by use of the equation (21), the adiabatic efficiency ηt of the turbine 32 has strong correlations with the turbine flow rate Qt and the before/after-turbine pressure ratio P3/P4; therefore, the adiabatic efficiency ηt of the turbine 32 can be calculated from any one of the turbine flow rate Qt and the before/after-turbine pressure ratio P3/P4. There exists a strong correlation between the exhaust gas flow rate Qex, which becomes equal to the turbine flow rate Qt, and the exhaust-gas temperature T3. Accordingly, the before/after-turbine pressure ratio P3/P4, the adiabatic efficiency ηt of the turbine 32, and the exhaust-gas temperature T3, which are required for calculating the turbine output Pt in the equation (18), can be calculated based on the turbine flow rate Qt. Therefore, the turbine output Pt (the driving force for the compressor 31) can be calculated based on the turbine flow rate Qt; conversely, the turbine flow rate Qt can be calculated based on the turbine output Pt (the driving force for the compressor 31). In addition, the turbine output Pt can be calculated also based on the before/after-turbine pressure ratio P3/P4; conversely, the before/after-turbine pressure ratio P3/P4 can be calculated based on the turbine output Pt.

In Embodiment 1, as the target compressor driving force Pct to be utilized in calculating the target turbine flow rate Qtt, the target compressor driving force Pct0, which has been converted into target compressor driving force under the standard environment condition, is utilized; in the turbine flow rate map MAP4, the relationship between the turbine flow rate Qt0 and the turbine output Pt0, which have been converted into a turbine flow rate and a turbine output under the standard atmospheric condition, are preliminarily set. Accordingly, the target turbine flow rate Qtt to be calculated in the equation (25) is the target turbine flow rate Qtt (hereinafter, referred to as a target turbine flow rate Qtt0), which has been converted into a target turbine flow rate under the standard atmospheric condition. Thus, it is required to re-convert the target turbine flow rate Qtt0, which has been converted into a target turbine flow rate under the standard atmospheric condition, into the target turbine flow rate Qtt under the present environment. Thus, as represented in the equation (26) below, the target turbine flow rate calculation unit 133 multiplies the target turbine flow rate Qtt0 by an environment correction coefficient calculated based on the real atmospheric pressure P1$r$ and the real intake air temperature T1$r$ so as to calculate the target turbine flow rate Qtt, which has been converted into a target turbine flow rate under the present environment.

$$Qtt = \frac{Qtt0}{\frac{P10}{P1r} \cdot \sqrt{\frac{T1r}{T10}}} \quad (26)$$

<Exhaust Gas Flow Rate Calculation Unit 134>

The exhaust gas flow rate calculation unit 134 calculates the exhaust gas flow rate Qex, based on the real intake air flow rate Qar and the air-fuel ratio AF. In Embodiment 1, as represented in the equation (27) below, the exhaust gas flow rate calculation unit 134 calculates the exhaust gas flow rate Qex, based on the real in-cylinder fresh air amount Qcr calculated based on the real intake air flow rate Qar and the exhaust gas air-fuel ratio AF detected by the air-fuel ratio sensor 16. Instead of Qcr/ΔT, the real intake air flow rate Qar may be utilized; as the air-fuel ratio AF, the target value of the air-fuel ratio AF, which is utilized in the fuel calculation, may be utilized.

$$Qex = \frac{Qcr}{\Delta T}\left(1 + \frac{1}{AF}\right) \quad (27)$$

<Target Gate Flow Rate Calculation Unit 135>

The target gate flow rate calculation unit 135 calculates the target wastegate flow rate Qwgt, based on the exhaust gas flow rate Qex and the target turbine flow rate Qtt. In Embodiment 1, as represented in the equation (28) below, the target gate flow rate calculation unit 135 subtracts the target turbine flow rate Qtt from the exhaust gas flow rate Qex so as to calculate the target wastegate flow rate Qwgt.

$$Qwgt = Qex - Qtt \quad (28)$$

<Target Before/After-Turbine Pressure Ratio Calculation Unit 136>

The target before/after-turbine pressure ratio calculation unit 136 calculates the target before/after-turbine pressure ratio P3$t$/P4$t$ for realizing the target compressor driving force Pct or the target before/after-compressor pressure ratio P2$t$/P1$r$ (in this example, the target compressor driving force Pct). In Embodiment 1, as represented in the equation (29) below, the target before/after-turbine pressure ratio calculation unit 136 calculates, as the target before/after-turbine pressure ratio P3$t$/P4$t$, the before/after-turbine pressure ratio P3/P4 corresponding to the target compressor driving force Pct, by use of a turbine pressure ratio map MAP5 in which the relationship between the before/after-turbine pressure ratio P3/P4 and the turbine output Pt, which is driving force for the compressor 31, is preliminarily set.

$$P3t/P4t = MAP5(Pct) \quad (29)$$

As referred to above, there exists a strong correlation between the turbine output Pt and the before/after-turbine pressure ratio P3/P4; therefore, the target before/after-turbine pressure ratio P3$t$/P4$t$ for realizing the target compressor driving force Pct can accurately be calculated.

In some cases, depending on the characteristic of the supercharger 36, the correlation between the before/after-turbine pressure ratio P3/P4 and the before/after-compressor pressure ratio P2/P1 is stronger than the correlation between the before/after-turbine pressure ratio P3/P4 and the compressor driving force Pc. In that case, it may be allowed that as represented in the equation (30) below, the target before/after-turbine pressure ratio calculation unit 136 calculates, as the target before/after-turbine pressure ratio P3$t$/P4$t$, the before/after-turbine pressure ratio P3/P4 corresponding to the target before/after-compressor pressure ratio P2$t$/P1$r$, by use of a turbine pressure ratio map MAP5* in which the relationship between the before/after-compressor pressure ratio P2/P1 and the before/after-turbine pressure ratio P3/P4 is preliminarily set.

$$P3t/P4t = MAP5*(P2t/P1r) \quad (30)$$

The turbine pressure ratio map MAP5* can preliminarily be set based on experimental data measured on the supercharger 36 itself that has not been mounted in the engine 1.

<Target Turbine-Upstream Pressure Calculation Unit 137>

The target turbine-upstream pressure calculation unit 137 calculates the turbine-downstream pressure P4, based on the exhaust gas flow rate Qex, and then calculates the target turbine-upstream pressure P3$t$, which is the target value of the turbine-upstream pressure P3, based on the turbine-downstream pressure P4 and the target before/after-turbine pressure ratio P3$t$/P4$t$.

In Embodiment 1, as represented in the equation (31) below, the target turbine-upstream pressure calculation unit 137 calculates an atmospheric-pressure pressure ratio P4/P1, which is the pressure ratio of the turbine-downstream pressure P4 and the atmospheric pressure P1, corresponding to the exhaust gas flow rate Qex, by use of a turbine-downstream pressure ratio map MAP6 in which the relationship between the exhaust gas flow rate Qex and the atmospheric-pressure pressure ratio P4/P1 is preliminarily set.

$$P4/P1 = MAP6(Qex) \quad (31)$$

The turbine-downstream pressure ratio map MAP6 can preliminarily be set based on experimental data measured on the engine 1 in which the supercharger 36 has been mounted. In this regard, however, because being determined by an exhaust resister including a catalyst, a muffler, and the like, the characteristic of the turbine-downstream pressure ratio map MAP6 is the basic characteristic of the engine 1, which does not depend on the specification of the supercharger 36; therefore, even when the specification of the supercharger 36 is changed, the turbine-downstream pressure ratio map MAP6 can be utilized.

The target turbine-upstream pressure calculation unit 137 calculates the turbine-downstream pressure P4, based on the atmospheric-pressure pressure ratio P4/P1 and the real atmospheric pressure P1$r$, and then calculates the target turbine-upstream pressure P3$t$, based on the turbine-downstream pressure P4 and the target before/after-turbine pressure ratio P3$t$/P4$t$. Specifically, as represented in the equation (32) below, the target turbine-upstream pressure calculation unit 137 calculates the turbine-downstream pressure P4 by multiplying the atmospheric-pressure pressure ratio P4/P1 by the real atmospheric pressure P1r. Then, as represented in the equation (33) below, the target turbine-upstream pressure calculation unit 137 calculates the target turbine-upstream pressure P3t by multiplying the target before/after-turbine pressure ratio P3t/P4t by the turbine-downstream pressure P4.

$$P4=(P4/P1)\times P1r \quad (32)$$

$$P3t=(P3t/P4t)\times P4 \quad (33)$$

<Target Gate Effective Opening Area Calculation Unit 138>

Based on the target wastegate flow rate Qwgt, the target before/after-turbine pressure ratio P3t/P4t, and the target turbine-upstream pressure P3t, the target gate effective opening area calculation unit 138 calculates the target gate effective opening area Swgt.

In Embodiment 1, the target gate effective opening area calculation unit 138 calculates the target gate effective opening area Swgt for realizing the target wastegate flow rate Qwgt, by use of a fluid-mechanics theoretical formula, i.e., an orifice flow rate calculation equation for a compressible fluid, in which as is the case with the above-mentioned throttle valve 4, the flow in the vicinity of the wastegate valve 34 is regarded as flows before and after a throttle valve.

As is the case with the equation (14) above, the theoretical equation for the flow rate Qwg [g/s] of air that flows through the wastegate valve 34, which is regarded as a throttle valve, is derived as represented in the equation (34) below, from the energy conservation law, an isoentropic flow relational equation, a sonic velocity relational equation, and a state equation.

$$Qwg = \rho3 \cdot a3 \cdot Swg \cdot \sigma3 \quad (34)$$

$$\because a3 = \sqrt{\kappa \cdot R \cdot T3}, \quad \sigma3 = \sqrt{\frac{2}{\kappa-1}\left[\left(\frac{P4}{P3}\right)^{\frac{2}{\kappa}} - \left(\frac{P4}{P3}\right)^{\frac{\kappa+1}{\kappa}}\right]},$$

$$\rho3 = \frac{P3}{R \cdot T3}$$

where ρ3, T3, a3, and Swg are an exhaust-gas density at the upstream, side of the wastegate valve 34, an exhaust-gas temperature at the upstream side of the wastegate valve 34, an exhaust-gas sonic velocity at the upstream side of the wastegate valve 34, and an effective opening area of the wastegate valve 34, respectively. The character σ3 is a flow rate correction coefficient that changes in accordance with the pressure ratio P4/P3 of the flow at downstream side of (after) the wastegate valve 34 to the flow at the upstream side of (before) the wastegate valve 34.

As represented in the equation (35), the target gate effective opening area calculation unit 138 calculates the flow rate correction coefficient σ3 corresponding to the target before/after-turbine pressure ratio P3t/P4t, by use of a flow rate correction coefficient map MAP7 in which the relationship between the before/after-turbine pressure ratio P3/P4 and the flow rate correction coefficient σ3 is preliminarily set, based on the theoretical equation, for the flow rate correction coefficient σ3, in the equation (34) above.

$$\sigma3=MAP7(P3t/P4t) \quad (35)$$

Based on the real intake air flow rate Qar and the real rotation speed Ner, the target gate effective opening area calculation unit 138 calculates the exhaust-gas temperature T3. In Embodiment 1, as represented in the equation (36) below, the target gate effective opening area calculation unit 138 calculates the exhaust-gas temperature T3 corresponding to the real rotation speed Ner and the real charging efficiency Ecr that is calculated based on the real intake air flow rate Qar, by use of an exhaust gas temperature map MAP8 in which the relationship among the charging efficiency Ec, the rotation speed Ne, and the exhaust-gas temperature T3 is preliminarily set. It may be allowed that the target gate effective opening area calculation unit 138 calculates, as the final exhaust-gas temperature T3, a value obtained by applying lag filtering processing to the exhaust-gas temperature T3 calculated by use of the exhaust gas temperature map MAP8. The exhaust gas temperature map MAP8 can preliminarily be set based on experimental data measured on the engine 1. Because it is the basic characteristic of the engine 1, which does not depend on the specification of the supercharger 36 disposed at the downstream side of the engine 1, the characteristic of the exhaust gas temperature map MAP8 can be utilized even when the specification of the supercharger 36 is changed.

$$T3=MAP8(Ecr,Ner) \quad (36)$$

As represented in the equation (37) below, the target gate effective opening area calculation unit 138 calculates the sonic velocity a3 corresponding to the exhaust-gas temperature T3, by use of a sonic velocity map MAP9 in which the relationship between the temperature T3 and the sonic velocity a3 is preliminarily set based on the theoretical equation for the sonic velocity a3 in the equation (34) above.

$$a3=MAP9(T3) \quad (37)$$

As represented in the equation (38) below, the target gate effective opening area calculation unit 138 utilizes the theoretical equation for the density ρ3 in the equation (34) above so as to calculate the density ρ3, based on the target turbine-upstream pressure P3t and the exhaust-gas temperature T3.

$$\rho3=P3t/(R\times T3) \quad (38)$$

Then, as represented in the equation (39) below, the target gate effective opening area calculation unit 138 divides the target wastegate flow rate Qwgt by the flow rate correction coefficient σ3, the sonic velocity a3, and the density ρ3 so as to calculate the target gate effective opening area Swgt.

$$Swgt=Qwgt/(\sigma3\times a3\times \rho3) \quad (39)$$

<Gate Valve Control Value Calculation Unit 139>

The gate valve control value calculation unit 139 calculates the gate valve control value WG, based on the target gate effective opening area Swgt. Based on the gate valve control value WG, The gate valve control value calculation unit 139 outputs a control signal to the gate valve actuator 34a so as to perform driving control of the wastegate valve 34.

In Embodiment 1, the gate valve actuator 34a, which is an electric type, is utilized; as represented in the equation (40) below, the gate valve control value calculation unit 139 calculates the gate valve control value WG corresponding to the target gate effective opening area Swgt, by use of an effective opening area map MAP10 in which the relationship between the effective opening area Swg of the wastegate valve 34 and the gate valve control value WG is preliminarily set. The effective opening area map MAP10 can preliminarily be set based on experimental data measured on the supercharger 36 (the wastegate valve 34, the gate valve actuator 34a) itself that has not been mounted in the engine 1.

$$WG = MAP10(Swqt) \quad (40)$$

In the case where the gate valve actuator 34a, which is a pressure type, is utilized, it may be allowed that the gate valve control value calculation unit 139 calculates the gate valve control value WG corresponding to the target gate effective opening area Swgt and the real before/after-compressor pressure ratio P2r/P1r, by use of an effective opening area map in which the relationship among the effective opening area Swg of the wastegate valve 34, the before/after-compressor pressure ratio P2/P1, and the gate valve control value WG is preliminarily set. Also in this case, the effective opening area map can preliminarily be set based on experimental data measured on the supercharger 36 (the wastegate valve 34, the gate valve actuator 34a) itself that has not been mounted in the engine 1.

The gate valve control value calculation unit 139 implements driving force feedback control for changing a feedback correction value WGfb, which corrects the gate valve control value WG, so that the real compressor driving force Par calculated by the real compressor driving force calculation unit 140 approaches the target compressor driving force Pct. The Gate valve control value calculation unit 139 utilizes, as the final gate valve control value WG, a value obtained by correcting the gate valve control value WG with the feedback correction value WGfb.

Moreover, the gate valve control value calculation unit 139 implements driving force feedback learning control so as to change a feedback learning value WGlrn for correcting the gate valve control value WG in accordance with a deviation amount of the feedback correction value WGfb from zero. Then, as represented in the equation (41) below, the gate valve control value calculation unit 139 utilizes, as the final gate valve control value WG, a value obtained by correcting the gate valve control value WG with the feedback correction value WGfb and the feedback learning value WGlrn. Here, the gate valve control value WG calculated based on the target gate effective opening area Swgt is called as a basic gate valve control value WGb.

$$WG = WGb + WGfb + WGlrn \quad (41)$$

As the driving force feedback control, the gate valve control value calculation unit 139 implements PID control for calculating the feedback correction value WGfb through a proportional operation, an integral operation, and a differential operation based on the difference between the target compressor driving force Pct and the real compressor driving force Pcr. As represented in the equation (42) below, the gate valve control value calculation unit 139 adds a proportional operation value WGfbp, an integral operation value WGfbi, and a differential operation value WGfbd so as to calculate the feedback correction value WGfb.

$$WGfb = WGfbp + WGfbi + WGfbd \quad (42)$$

As the driving force feedback learning control, the gate valve control value calculation unit 139 calculates, as the feedback learning value WGlrn, the amount, of a deviation between the integral operation value WGfbi and zero, that exceeds a preliminarily set threshold value. The driving force feedback learning control is implemented in order to absorb a stationary feedback difference caused by variation elements such as an individual difference of the supercharger 36 and a change with time so as to reduce the effects of the variation elements.

As described above, the driving force feedback control and the driving force feedback learning control can raise the accuracy in control of the target compressor driving force Pct by the bypass valve actuator 33a.

As the driving force feedback control, the gate valve control value calculation unit 139 may change the feedback correction value WGfb in such a way that a real turbine flow rate Qtr approaches a target turbine flow rate Qtt; alternatively, the gate valve control value calculation unit 139 may change the feedback correction value WGfb in such a way that a real wastegate flow rate Qwgr approaches the target wastegate flow rate Qwgt. In these cases, the accuracy in the control of the target compressor driving force Pct can be raised.

2-4. Flowchart

Figure 4:
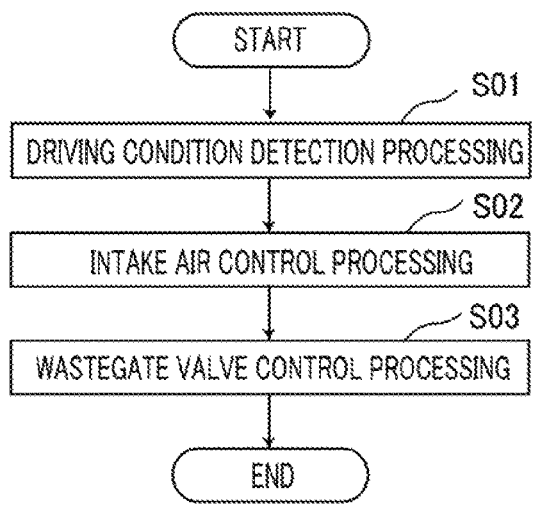
FIG. 4 is a flowchart representing the processing by the controller according to Embodiment 1 of the present invention.
Figure 5:
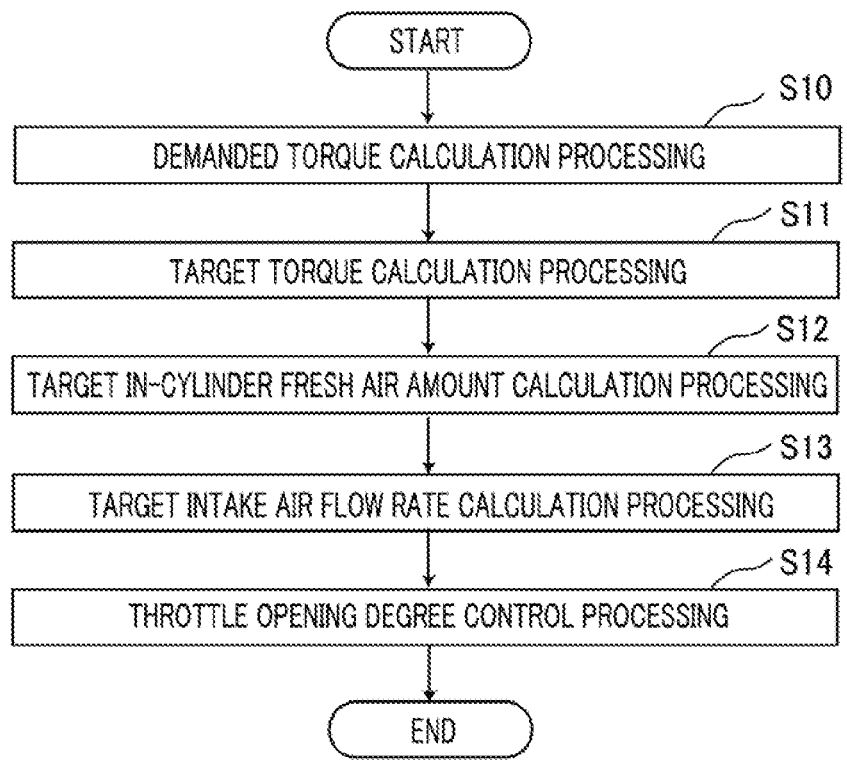
FIG. 5 is a flowchart representing the processing by an intake air control unit according to Embodiment 1 of the present invention.
Figure 6:
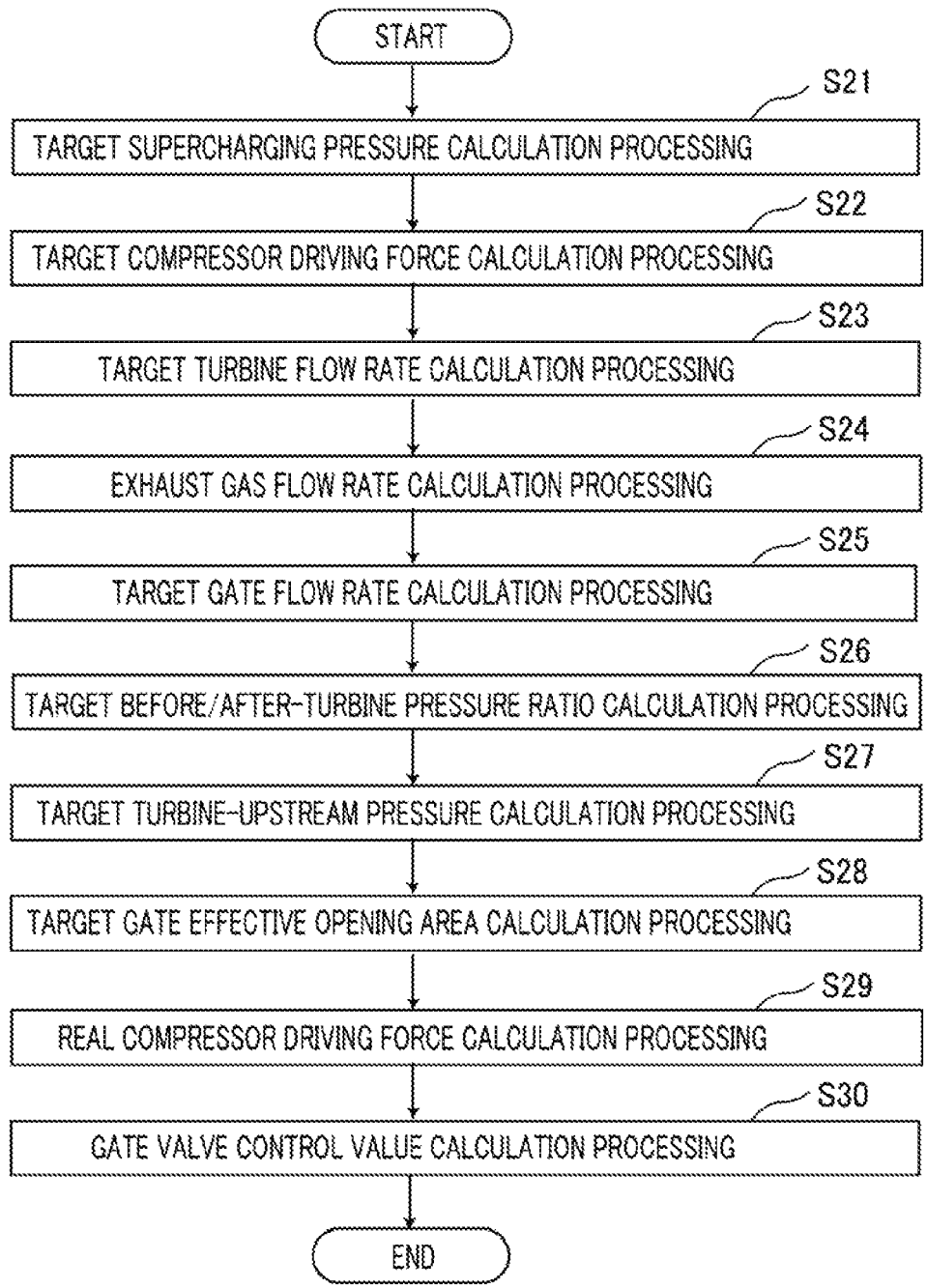
FIG. 6 is a flowchart representing the processing by a wastegate valve control unit according to Embodiment 1 of the present invention.

The procedure (the method of controlling the engine 1 equipped with the supercharger 36) of processing by the controller 100 according to Embodiment 1 will be explained based on the flowcharts represented in FIGS. 4 through 6. The processing items represented in the flowcharts in FIGS. 4 through 6 are recurrently implemented every constant operation cycle while the computing processing unit 90 implements software (a program) stored in the storage apparatus 91.

At first, the flowchart in FIG. 4 will be explained.

In the step S01, the driving-condition detection unit 110 implements driving condition detection processing (a driving condition detection step) for, as mentioned above, detecting the driving condition of the engine 1. The driving-condition detection unit 110 detects the real rotation speed Ner of the engine 1, the real intake air flow rate Qar, and the real atmospheric pressure P1r. In addition to the foregoing driving conditions, the driving-condition detection unit 110 detects various kinds of driving conditions such as the real intake air temperature T1r, the real throttle opening degree THr, the real manifold pressure Pbr, the exhaust gas air-fuel ratio AF, the real supercharging pressure P2r, and the accelerator opening degree D. Here, the driving-condition detection unit 110 (the real intake air flow rate calculation unit 141) implements real intake air flow rate calculation processing (a real intake air flow rate calculation step) for, as described above, calculating the real intake air flow rate Qar. As mentioned above, the driving-condition detection unit 110 (the real in-cylinder fresh air amount calculation unit 142) implements real in-cylinder fresh air amount calculation processing (a real in-cylinder fresh air amount calculation step) for, as described above, calculating the real charging efficiency Ecr and the real in-cylinder fresh air amount Qcr, based on the output signal of the air flow sensor 12 or the manifold pressure sensor 15. Moreover, the driving-condition detection unit 110 (the estimated torque calculation unit 143) implements estimated torque calculation processing (an estimated torque calculation step) for, as described above, calculating the estimated output torque TRQr of the engine 1 or the estimated indicated mean effective pressure Pir.

Next, in the step S02, the intake air control unit 111 implements intake air control processing (an intake air control step) for, as described above, controlling intake air of the engine 1. The intake air control unit 111 calculates the target intake air flow rate Qat and the target charging efficiency Ect. The details of the processing in the step S02 will be represented in the flowchart in FIG. 5. En the step S10, the demanded torque calculation unit 120 implements demanded torque calculation processing (a demanded torque calculation step) for, as described above, calculating the demanded output torque TRQd, based on the accelerator opening degree D, a demand from an external controller, and the like. Next, in the step S11, the target torque calculation unit 121 implements target torque calculation processing (a target torque calculation step) for, as described above, calculating the target output torque TRQt or the target indicated mean effective pressure Pit, based on the demanded output torque TRQd. Then, in the step S12, the target in-cylinder fresh air amount calculation unit 122 implements target in-cylinder fresh air amount calculation processing (a target in-cylinder fresh air amount calculation step) for, as described above, calculating the target charging efficiency Ect and the target in-cylinder fresh air amount Qct, based on the target output torque TRQt or the target indicated mean effective pressure Pit. In the step S13, the target intake air flow rate calculation unit 123 implements target intake air flow rate calculation processing (a target intake air flow rate calculation step) for, as described above, calculating the target intake air flow rate Qat, based on the target in-cylinder fresh air amount Qct. In the step S14, the throttle opening degree control unit 124 implements throttle opening degree control processing (a throttle opening degree control step) for, as described above, controlling the throttle opening degree, based on the target intake air flow rate Qat.

Next, in the step S03 in FIG. 4, the wastegate valve control unit 112 implements wastegate valve control processing (a wastegate valve control step) for, as described above, performing driving control of the wastegate valve 34 so as to control the supercharging pressure P2. The details of the processing in the step S03 will be represented in the flowchart in FIG. 6. In the step S21, the target supercharging pressure calculation unit 131 implements target supercharging pressure calculation processing (a target supercharging pressure calculation step) for, as described above, calculating the target supercharging pressure P2t, based on the target charging efficiency Ect and the real rotation speed Ner. In the step S22, the target compressor driving force calculation unit 132 implements target compressor driving force calculation processing (a target compressor driving force calculation step) for, as described above, calculating the target compressor driving force Pct, based on at least one of the target intake air flow rate Qat calculated in the intake air control step and the target before/after-compressor pressure ratio P2t/P1r, which is the pressure ratio of the target supercharging pressure P2t and the real atmospheric pressure P1r.

In the step S23, the target turbine flow rate calculation unit 133 implements target turbine flow rate calculation processing (a target turbine flow rate calculation step) for, as described above, calculating the target turbine flow rate Qtt that realizes the target compressor driving force Pct. In the step S24, the exhaust gas flow rate calculation unit 134 implements exhaust gas flow rate calculation processing (an exhaust gas flow rate calculation step) for, as described above, calculating the exhaust gas flow rate Qex, based on the real intake air flow rate Qar and the air-fuel ratio AF of the engine 1. In the step S25, the target gate flow rate calculation unit 135 implements target gate flow rate calculation processing (a target gate flow rate calculation step) for, as described above, calculating the target wastegate flow rate Qwgt, based on the exhaust gas flow rate Qex and the target turbine flow rate Qtt. In the step S26, the target before/after-turbine pressure ratio calculation unit 136 implements target before/after-turbine pressure ratio calculation processing (a target before/after-turbine pressure ratio calculation step) for, as described above, calculating the target before/after-turbine pressure ratio P3t/P4t that realizes the target compressor driving force Pct or the target before/after-compressor pressure ratio P2t/P1r.

In the step S27, the target turbine-upstream pressure calculation unit 137 implements target turbine-upstream pressure calculation processing target turbine-upstream pressure calculation step) for, as described above, calculating the turbine-downstream pressure P4, based on the exhaust gas flow rate Qex, and then calculating the target turbine-upstream pressure P3t, based on the turbine-downstream pressure P4 and the target before/after-turbine pressure ratio P3t/P4t. In the step S28, the target gate effective opening area calculation unit 138 implements target gate effective opening area calculation processing (a target gate effective opening area calculation step) for, as described above, calculating the target gate effective opening area Swgt, which is the target value of the effective opening area Swg of the wastegate valve 34, based on the target wastegate flow rate Qwgt, the target before/after-turbine pressure ratio P3t/P4t and the target turbine-upstream pressure P3t.

In Embodiment 1, in the step S29, the real compressor driving force calculation unit 140 implements real compressor driving force calculation processing (a real compressor driving force calculation step) for, as described above, calculating the real compressor driving force Pcr, based on the real intake air flow rate Qar and the real supercharging pressure P2r.

In the step S30, the gate valve control value calculation unit 139 implements gate valve control value calculation processing (a gate valve control value calculation step) for, as described above, calculating the gate valve control value WG, which is the control value WG for the gate valve actuator 34a, based on the target gate effective opening area Swgt, and performing driving control of the wastegate valve 34 based on the gate valve control value WG. In Embodiment 1, the gate valve control value calculation unit. 139 implements driving force feedback control processing (a driving force feedback control step) for, as described above, correcting the gate valve control value WG by changing the feedback correction value WGfb so that the real compressor driving force Pcr approaches the target compressor driving force Pct. Moreover, the gate valve control value calculation unit 139 implements driving force feedback learning control processing (a driving force feedback learning control step) for, as described above, correcting the gate valve control value WG by changing the feedback learning value WGlrn in accordance with a deviation amount of the feedback correction value WGfb from zero.

3. Summary

The controller 100 according to Embodiment 1 makes it possible that the engine 1 equipped with the supercharger 36 including the wastegate valve 34 has excellent characteristics such as operation with high acceleration responsiveness, driving at a fuel optimum point, and capability of learning variation elements; furthermore, the controller 100 according to Embodiment 1 makes it possible that the work for data measurement and matching, which needs to be implemented after the engine 1 and the supercharger 36 have been integrated with each other, can be reduced in comparison with conventional technologies.

Moreover, in the controller 100 according to Embodiment 1, the intake air control unit 111 calculates the demanded output torque TRQd, based on the accelerating operation of a driver and the torque demanded value from an external controller, calculates the target intake air flow rate Qat with which the demanded output torque TRQd can be achieved, calculates a target throttle opening degree so as to achieve the target intake air flow rate Qat, then controls the throttle opening degree. As a result, it is made possible to realize the torque demand from the driver or another controller, separately from the control system of the wastegate valve 34; thus, change of acceleration-response characteristic can readily be realized.

In contrast, in the case where because the torque demanded value is large, supercharging is required to realize the target intake air flow rate Qat, the target supercharging pressure P2t that is the same as or larger than the atmospheric pressure P1 is calculated; accordingly, because the target compressor driving force Pct becomes a positive value (the same as or larger than "0"), the target turbine flow rate Qtt corresponding to this positive value is calculated. Moreover, in the case where the exhaust gas flow rate Qex is larger than the target turbine flow rate Qtt the target wastegate flow rate Qwgt of exhaust gas that passes the wastegate valve 34 so as to bypass the turbine 32 is calculated, a wastegate valve opening degree with which the target wastegate flow rate Qwgt can be achieved is calculated based on the orifice flow rate calculation equation for a compressible fluid, then, driving control is applied to the wastegate valve 34.

Because in this way, the supercharging pressure P2 required to achieve the target intake air flow rate Qat is accurately controlled by operating the wastegate valve 34, it is made possible to perform driving at a fuel optimum point while eliminating wasteful supercharging; furthermore, the throttle valve 4 is operated; thus, the target intake air flow rate Qat can finally be achieved. Moreover, because the wastegate valve opening degree is learned, it is made possible to learn variation elements.

The maps MAP1 through MAP10 to be utilized in the wastegate valve control unit 112 are collectively represented in FIG. 7.

The pressure addition value map MAP1 is a map in which the relationship among the target charging efficiency Ect, the rotation speed Ne, and the pressure addition value KP2 is preliminarily set, and is utilized in the target supercharging pressure calculation unit 131. The pressure addition value map MAP1 can be set through desk-top designing.

The pressure ratio correction coefficient map MAP2 is a map in which the relationship between the before/after-compressor pressure ratio P2/P1 and the pressure ratio correction coefficient F1 is preliminarily set, and is utilized in the target compressor driving force calculation unit 132. The pressure ratio correction coefficient map MAP2 is set based on the theoretical equation represented in the equation (20).

The adiabatic efficiency calculation map MAP3 is a map in which the relationship among the intake air flow rate Qa, the before/after-compressor pressure ratio P2/P1, and the adiabatic efficiency ηc of the compressor 31 is preliminarily set, and is utilized in the target compressor driving force calculation unit 132. The adiabatic efficiency calculation map MAP3 is set based on experimental data measured on the supercharger 36 (the compressor 31) itself that has not been mounted in the engine 1.

The turbine flow rate map MAP4 is a map in which the relationship between the turbine output Pt and the turbine flow rate Qt is preliminarily set, and is utilized in the target turbine flow rate calculation unit 133. The turbine flow rate map MAP4 is set based on experimental data measured on the supercharger 36 (the turbine 32) itself that has not been mounted in the engine 1.

The turbine pressure ratio map MAP5 is a map in which the relationship between the turbine output Pt and the before/after-turbine pressure ratio P3/P4 is preliminarily set, and is utilized in the target before/after-turbine pressure ratio calculation unit 136. The turbine pressure ratio map MAP5 is set based on experimental data measured on the supercharger 36 (the turbine 32) itself that has not been mounted in the engine 1.

The turbine-downstream pressure ratio map MAP6 is a map in which the relationship between the exhaust gas flow rate Qex and the atmospheric-pressure pressure ratio P4/P1, which is the pressure ratio of the turbine-downstream pressure P4 and the atmospheric pressure P1, is preliminarily set, and is utilized in the target turbine-upstream pressure calculation unit 137. The turbine-downstream pressure ratio map MAP6 is determined by an exhaust resister including a catalyst, a muffler, and the like provided at the downstream side of the supercharger 36, and is set based on experimental data on the engine 1, which does not depend on the specification of the supercharger 36.

The flow rate correction coefficient map MAP7 is a map in which the relationship between the before/after-turbine pressure ratio P3/P4 and the flow rate correction coefficient σ3 is preliminarily set, and is utilized in the target gate effective opening area calculation unit 138. The flow rate correction coefficient map MAP7 is set based on the theoretical equation represented in the equation (34).

The exhaust gas temperature map MAP8 is a map in which the relationship among the charging efficiency Ec, the rotation speed Ne, and the exhaust-gas temperature T3 is preliminarily set, and is utilized in the target gate effective opening area calculation unit 138. The exhaust gas temperature map MAP8 is set based on experimental data on the engine 1, which does not depend on the specification of the supercharger 36 disposed at the downstream side of the engine 1.

The sonic velocity map MAP9 is a map in which the relationship between the temperature T3 and the sonic velocity a3 is preliminarily set, and is utilized in the target gate effective opening area calculation unit 138. The sonic velocity map MAP9 is set based on the theoretical equation represented in the equation (34).

The effective opening area map MAP10 is a map in which the relationship between the effective opening area Swg of the wastegate valve 34 and the gate valve control value WG is preliminarily set, and is utilized in the gate valve control value calculation unit 139. The effective opening area map MAP10 is set based on experimental data measured on the supercharger 36 (the wastegate valve 34, the gate valve actuator 34*a*) itself that has not been mounted in the engine 1.

As described above, each of the pressure addition value map MAP1, the pressure ratio correction coefficient map MAP2, the flow rate correction coefficient map MAP7, and the sonic velocity map MAP9 can be set in a desk-top designing manner, based on a theoretical equation or the like, and can be utilized even when the specification of the engine 1 or the supercharger 36 is changed.

Each of the adiabatic efficiency calculation map MAP3, the turbine flow rate map MAP4, the turbine pressure ratio map MAP5, and the effective opening area map MAP10 can be set based on experimental data measured on the supercharger 36 itself that has not been mounted in the engine 1, and can be utilized even when the specification of the engine 1 is changed, as long as the specification of a single and the same supercharger 36 is utilized.

Each of the turbine-downstream pressure ratio map MAP6 and the exhaust gas temperature map MAP8 can be set based on experimental data on the engine 1, which does not depend on the specification of the supercharger 36, and can be utilized even when the specification of the supercharger 36 is changed, as long as the specification of a single and the same engine 1 is utilized.

As described above, the maps MAP1 through MAP10 to be utilized in the wastegate valve control unit 112 are categorized by a theoretical value, the characteristic of the supercharger 36 itself, or the characteristic of the engine 1. Speaking reversely, the control units of the wastegate valve control unit 112 are designed in such a way that the maps categorized by a theoretical value, the characteristic of the supercharger 36 itself, or the characteristic of the engine 1 can be utilized therein. Accordingly, even in the case where in the engine 1 with a single and the same specification, the supercharger 36 is replaced by another one with a different specification or the supercharger 36 with a single and the same specification is utilized in another engine 1 with a different specification, the map can be utilized; as a result, the man-hours for data measurement and matching can be reduced.

In the present invention, a "map" denotes a function that represents the relationship between or among a plurality of variables; instead of a map, a polynomial, a mathematical expression, a data table, or the like can be utilized.

Various modifications and alterations of this invention will be apparent to those skilled in the art without departing from the scope and spirit of this invention, and it should be understood that this is not limited to the illustrative embodiments set forth herein.

What is claimed is:

1. A controller for an internal combustion engine equipped with a supercharger having a turbine provided in an exhaust path, a compressor that is provided at the upstream side of a throttle valve in an intake path and rotates integrally with the turbine, a wastegate valve provided in a bypass path, of the exhaust path, that bypasses the turbine, and a gate valve actuator that drives the wastegate valve, the controller comprising at least one processor configured to implement:

a driving-condition detector that detects a real rotation speed and a real intake air flow rate of the internal combustion engine and a real atmospheric pressure;

an intake air controller that calculates a target intake air flow rate and a target charging efficiency of the internal combustion engine;

a target supercharging pressure calculator that calculates a target supercharging pressure, which is a target value of a supercharging pressure that is the pressure at a position, in the intake path, that is at the downstream side of the compressor and at the upstream side of the throttle valve, based on the target charging efficiency and the real rotation speed;

a target compressor driving force calculator that calculates a target compressor driving force, which is a target value of driving force for the compressor, based on at least one of the target intake air flow rate and a target before/after-compressor pressure ratio, which is a pressure ratio of the target supercharging pressure and the real atmospheric pressure;

a target turbine flow rate calculator that calculates a target turbine flow rate, for realizing the target compressor driving force, that is the flow rate of exhaust gas that flows through the turbine;

an exhaust gas flow rate calculator that calculates an exhaust gas flow rate that is exhausted from the internal combustion engine, based on the real intake air flow rate and an air-fuel ratio of the internal combustion engine;

a target gate flow rate calculator that calculates a target wastegate flow rate, which is a target value of a flow rate of exhaust gas that flows into the bypass path through the wastegate valve, based on the exhaust gas flow rate and the target turbine flow rate;

a target before/after-turbine pressure ratio calculator that calculates a target before/after-turbine pressure ratio, for realizing the target compressor driving force or the target before/after-compressor pressure ratio, that is the ratio of a pressure before the turbine and a pressure after the turbine;

a target turbine-upstream pressure calculator that calculates a turbine-downstream pressure, based on the exhaust gas flow rate, and then calculates a target turbine-upstream pressure, which is a target value of a turbine-upstream pressure, based on said turbine-downstream pressure and the target before/after-turbine pressure ratio;

a target gate effective opening area calculator that calculates a target gate effective opening area, which is a target value of an effective opening area of the wastegate valve, based on the target wastegate flow rate, the target before/after-turbine pressure ratio, and the target turbine-upstream pressure; and a gate valve control value calculator that calculates a gate valve control value, which is a control value for the gate valve actuator, based on the target gate effective opening area, and controls the gate valve actuator to drive the wastegate valve based on the gate valve control value.

2. The controller for the internal combustion engine equipped with the supercharger according to claim 1, wherein the driving-condition detector detects a real manifold pressure, which is a pressure in an intake manifold constituting a position, in the intake path, situated at the downstream side of the throttle valve, and a real intake air temperature, and wherein the target supercharging pressure calculator calculates a volumetric efficiency on the basis of the intake manifold, based on the real rotation speed and the real manifold pressure, calculates a target manifold pressure, which is a target value of a manifold pressure, based on the volumetric efficiency, the target charging efficiency, and the real intake air temperature, and then adds a pressure addition value to the target manifold pressure so as to calculate the target supercharging pressure.

3. The controller for the internal combustion engine equipped with the supercharger according to claim 1, wherein the target turbine flow rate calculator calculates, as the target turbine flow rate, the turbine flow rate corresponding to the target compressor driving force, by use of a map in which the relationship between a turbine flow rate and a turbine output, which is driving force for the compressor, is preliminarily set, wherein the target before/after-turbine pressure ratio calculator calculates, as the target before/after-turbine pressure ratio, the before/after-turbine pressure ratio corresponding to the target compressor driving force or the target before/after-compressor pressure ratio, by use of a map in which the relationship between driving force for the compressor or a before/after-compressor pressure ratio, which is the pressure ratio of the supercharging pressure and an atmospheric pressure, and a before/after-turbine pressure ratio, which is a pressure ratio of a pressure before the turbine and a pressure after the turbine, is preliminarily set, and wherein the target turbine-upstream pressure calculator calculates the atmospheric-pressure pressure ratio corresponding to the exhaust gas flow rate, by use of a map in which the relationship between the exhaust gas flow rate and an atmospheric-pressure pressure ratio, which is a pressure ratio of a turbine-downstream pressure and the atmospheric pressure, is preliminarily set, calculates a turbine-downstream pressure, based on said atmospheric-pressure pressure ratio and the real atmospheric pressure, and then calculates the target turbine-upstream pressure, based on said turbine-downstream pressure and the target before/after-turbine pressure ratio.

4. The controller for the internal combustion engine equipped with the supercharger according to claim 1, further comprising a real compressor driving force calculator that calculates a real compressor driving force, which is a detection value of driving force for the compressor, based on at least one of the real intake air flow rate and a real before/after-compressor pressure ratio, which is a pressure ratio of a real supercharging pressure detected by the driving-condition detector and the real atmospheric pressure, wherein the gate valve control value calculator implements driving force feedback control for changing a feedback correction value that corrects the gate valve control value in order to make the real compressor driving force approach the target compressor driving force, and sets a value obtained by correcting the gate valve control value with the feedback correction value as a final value of the gate valve control value.

5. The controller for the internal combustion engine equipped with the supercharger according to claim 4, wherein the gate valve control value calculator implements driving force feedback learning control for changing a feedback learning value that corrects the gate valve control value, in accordance with a deviation amount of the feedback correction value from zero, and sets a value obtained by correcting the gate valve control value with the feedback correction value and the feedback learning value as a final value of the gate valve control value.

6. A control method for an internal combustion engine equipped with a supercharger having a turbine provided in an exhaust path, a compressor that is provided at the upstream side of a throttle valve in an intake path and rotates integrally with the turbine, a wastegate valve provided in a bypass path, of the exhaust path, that bypasses the turbine, and a gate valve actuator that drives the wastegate valve, the control method comprising:

detecting a real rotation speed and a real intake air flow rate of the internal combustion engine and a real atmospheric pressure via at least one driving-condition detector; and via a controller, calculating a target intake air flow rate and a target charging efficiency of the internal combustion engine;

calculating a target supercharging pressure, which is a target value of a supercharging pressure that is the pressure at a position, in the intake path-portion, that is at the downstream side of the compressor and at the upstream side of the throttle valve, based on the target charging efficiency and the real rotation speed;

calculating a target compressor driving force, which is a target value of driving force for the compressor, based on at least one of the target intake air flow rate and a target before/after-compressor pressure ratio, which is a pressure ratio of the target supercharging pressure and the real atmospheric pressure;

calculating a target turbine flow rate, for realizing the target compressor driving force, that is the flow rate of exhaust gas that flows through the turbine;

calculating an exhaust gas flow rate that is exhausted from the internal combustion engine, based on the real intake air flow rate and an air-fuel ratio of the internal combustion engine;

calculating a target wastegate flow rate, which is a target value of a flow rate of exhaust gas that flows into the bypass path through the wastegate valve, based on the exhaust gas flow rate and the target turbine flow rate;

calculating a target before/after-turbine pressure ratio, for realizing the target compressor driving force or the target before/after-compressor pressure ratio, that is the ratio of a pressure before the turbine and a pressure after the turbine;

calculating a turbine-downstream pressure, based on the exhaust gas flow rate, and then calculates a target turbine-upstream pressure, which is a target value of a turbine-upstream pressure, based on said turbine-downstream pressure and the target before/after-turbine pressure ratio;

calculating a target gate effective opening area, which is a target value of an effective opening area of the wastegate valve, based on the target wastegate flow rate, the target before/after-turbine pressure ratio, and the target turbine-upstream pressure;

calculating a gate valve control value, which is a control value for the gate valve actuator, based on the target gate effective opening area; and controlling the gate valve actuator to drive the wastegate valve based on the gate valve control value.

\* \* \* \* \*